United States Patent
Kim et al.

(10) Patent No.: US 12,156,277 B2
(45) Date of Patent: Nov. 26, 2024

(54) DISCONTINUOUS DOWNLINK CHANNEL MONITORING

(71) Applicant: QUALCOMM Incorporated, San Diego, CA (US)

(72) Inventors: Yuchul Kim, San Diego, CA (US); Hwan Joon Kwon, San Diego, CA (US); Peter Pui Lok Ang, San Diego, CA (US); Huilin Xu, Temecula, CA (US); Jay Kumar Sundararajan, San Diego, CA (US); Krishna Kiran Mukkavilli, San Diego, CA (US); Yeliz Tokgoz, San Diego, CA (US); Jing Lei, San Diego, CA (US); Tingfang Ji, San Diego, CA (US); Ravi Agarwal, San Diego, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 17/313,643

(22) Filed: May 6, 2021

(65) Prior Publication Data
US 2021/0360732 A1 Nov. 18, 2021

Related U.S. Application Data

(60) Provisional application No. 63/026,535, filed on May 18, 2020.

(51) Int. Cl.
*H04W 76/28* (2018.01)
*H04W 72/10* (2009.01)
*H04W 72/23* (2023.01)

(52) U.S. Cl.
CPC ........... *H04W 76/28* (2018.02); *H04W 72/23* (2023.01)

(58) Field of Classification Search
CPC ............................ H04W 76/28; H04W 72/042
See application file for complete search history.

(56) References Cited

U.S. PATENT DOCUMENTS

| 2019/0097874 A1 | 3/2019 | Zhou et al. |
| 2020/0229092 A1* | 7/2020 | Wu .................. H04W 52/0219 |

(Continued)

FOREIGN PATENT DOCUMENTS

EP 3627910 A1 3/2020

OTHER PUBLICATIONS

International Search Report and Written Opinion—PCT/US2021/031417—ISAEPO—dated Aug. 5, 2021.

*Primary Examiner* — Ronald B Abelson
(74) *Attorney, Agent, or Firm* — Holland & Hart LLP

(57) ABSTRACT

Methods, systems, and devices for wireless communications are described. A communication device, otherwise known as a user equipment (UE) may receive a downlink control information (DCI) message including an indication to enable discontinuous monitoring of a physical downlink control channel (PDCCH). The UE may enable the discontinuous monitoring of the PDCCH based on the received DCI message, and disable monitoring of the PDCCH during a temporal period in which at least one of physical downlink shared channel (PDSCH) reception, downlink reference signal monitoring, uplink reference signal transmissions, and channel reporting is enabled. The UE may thereby experience power saving by disabling monitoring of the PDCCH while still performing other wireless operations during the temporal period. The UE may, as a result, also include features for improvements to wireless communications and, in some examples, may promote high reliability and low latency wireless communications, among other benefits.

30 Claims, 18 Drawing Sheets

(56) References Cited

U.S. PATENT DOCUMENTS

| | | | |
|---|---|---|---|
| 2021/0029726 A1* | 1/2021 | Papasakellariou | H04W 72/535 |
| 2021/0314126 A1* | 10/2021 | Bae | H04W 72/14 |
| 2022/0060986 A1* | 2/2022 | Tie | H04W 72/042 |
| 2022/0061033 A1* | 2/2022 | Lin | H04L 5/0094 |
| 2022/0225139 A1* | 7/2022 | Seo | H04W 72/0453 |
| 2022/0303899 A1* | 9/2022 | Ma | H04W 52/0235 |
| 2022/0360364 A1* | 11/2022 | Li | H04W 76/28 |
| 2023/0247605 A1* | 8/2023 | Li | H04W 72/0453 |

\* cited by examiner

Data Traffic 205

DISCONTINUOUS DOWNLINK CHANNEL MONITORING

CROSS REFERENCE

The present Application for Patent claims the benefit of U.S. Provisional Patent Application No. 63/026,535 by KIM et al., entitled "DISCONTINUOUS DOWNLINK CHANNEL MONITORING," filed May 18, 2020, assigned to the assignee hereof, and expressly incorporated by reference herein.

FIELD OF TECHNOLOGY

The following relates generally to wireless communications including discontinuous downlink channel monitoring for wireless communications in wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the described techniques relate to configuring a communication device, which may be otherwise known as a user equipment (UE) to support discontinuous downlink channel monitoring. For example, the UE may be configured to disable monitoring of downlink channels, for example disable monitoring of physical downlink control channels (PDCCH) during a temporal period in which at least one of physical downlink shared channel (PDSCH) reception, downlink reference signal monitoring, uplink reference signal transmissions, and channel reporting is enabled. The UE may thereby experience power saving by disabling monitoring of the PDCCH while still performing other wireless operations during the temporal period. The described techniques may, as a result, also include features for improvements to wireless communications and, in some examples, may promote high reliability and low latency wireless communications, among other benefits.

A method of wireless communication at a UE is described. The method may include receiving a downlink control information (DCI) message including an indication to enable discontinuous monitoring of a PDCCH, enabling the discontinuous monitoring of the PDCCH based on the received DCI message, and disabling monitoring of the PDCCH during a temporal period in which at least one of PDSCH reception, downlink reference signal monitoring, uplink reference signal transmissions, and channel reporting are enabled.

An apparatus for wireless communication is described. The apparatus may include a processor, memory coupled with the processor, and instructions stored in the memory. The instructions may be executable by the processor to cause the apparatus to receive a DCI message including an indication to enable discontinuous monitoring of a PDCCH, enable the discontinuous monitoring of the PDCCH based on the received DCI message, and disable monitoring of the PDCCH during a temporal period in which at least one of PDSCH reception, downlink reference signal monitoring, uplink reference signal transmissions, and channel reporting are enabled.

Another apparatus for wireless communication is described. The apparatus may include means for receiving a DCI message including an indication to enable discontinuous monitoring of a PDCCH, enabling the discontinuous monitoring of the PDCCH based on the received DCI message, and disabling monitoring of the PDCCH during a temporal period in which at least one of PDSCH reception, downlink reference signal monitoring, uplink reference signal transmissions, and channel reporting are enabled.

A non-transitory computer-readable medium storing code for wireless communication at a UE is described. The code may include instructions executable by a processor to receive a DCI message including an indication to enable discontinuous monitoring of a PDCCH, enable the discontinuous monitoring of the PDCCH based on the received DCI message, and disable monitoring of the PDCCH during a temporal period in which at least one of PDSCH reception, downlink reference signal monitoring, uplink reference signal transmissions, and channel reporting are enabled.

In some examples of the method, apparatuses, and non-transitory computer-readable medium described herein, determining a discontinuous reception (DRX) cycle including an active portion and an inactive portion, where enabling the discontinuous monitoring of the PDCCH includes: enabling the discontinuous monitoring of the PDCCH during the DRX cycle, and disabling monitoring of the PDCCH includes: disabling monitoring of the PDCCH during at least the active portion of the DRX cycle.

In some examples of the method, apparatuses, and non-transitory computer-readable medium described herein, the indication includes a discontinuous PDCCH monitoring indication (DPMI), where enabling the discontinuous monitoring of the PDCCH during the DRX cycle may be based on the DPMI.

Some examples of the method, apparatuses, and non-transitory computer-readable medium described herein may further include operations, features, means, or instructions for determining that a connected mode DRX (C-DRX) mode may be disabled for the UE, where receiving the DCI message including the indication may be based on the C-DRX mode being disabled.

Some examples of the method, apparatuses, and non-transitory computer-readable medium described herein may further include operations, features, means, or instructions for identifying a type associated with the DPMI, and determining whether to enable monitoring of the PDCCH during at least the active portion based on the identified type associated with the DPMI.

Some examples of the method, apparatuses, and non-transitory computer-readable medium described herein may further include operations, features, means, or instructions for disabling the monitoring of the PDCCH until a subsequent active portion associated with a subsequent DRX cycle based on the identified type associated with the DPMI.

Some examples of the method, apparatuses, and non-transitory computer-readable medium described herein may further include operations, features, means, or instructions for determining the temporal period for disabling the monitoring of the PDCCH based on the identified type associated with the DPMI.

In some examples of the method, apparatuses, and non-transitory computer-readable medium described herein, the temporal period for disabling the monitoring of the PDCCH occurs within the active portion of the DRX cycle.

Some examples of the method, apparatuses, and non-transitory computer-readable medium described herein may further include operations, features, means, or instructions for determining that a retransmission timer associated with the DRX cycle may be disabled, where disabling the monitoring of the PDCCH may be based on determining that the retransmission timer may be disabled.

Some examples of the method, apparatuses, and non-transitory computer-readable medium described herein may further include operations, features, means, or instructions for determining that a retransmission timer associated with the DRX cycle may be enabled, and enabling monitoring of the PDCCH during at least the active portion based on determining the retransmission timer may be enabled.

Some examples of the method, apparatuses, and non-transitory computer-readable medium described herein may further include operations, features, means, or instructions for identifying a DPMI field in the received DCI message for downlink data transmission or uplink data transmission, or both, the DPMI field including an indication of whether discontinuous PDCCH monitoring may be enabled, where disabling monitoring of the PDCCH may be based on the DPMI field in the received DCI message.

In some examples of the method, apparatuses, and non-transitory computer-readable medium described herein, the DPMI field corresponds to one or more discontinuous PDCCH monitoring parameters.

In some examples of the method, apparatuses, and non-transitory computer-readable medium described herein, the one or more discontinuous PDCCH monitoring parameters indicate to refrain from disabling the monitoring of the PDCCH during at least the active portion.

In some examples of the method, apparatuses, and non-transitory computer-readable medium described herein, the one or more discontinuous PDCCH monitoring parameters indicate the temporal period for disabling the monitoring of the PDCCH during at least the active portion.

In some examples of the method, apparatuses, and non-transitory computer-readable medium described herein, the one or more discontinuous PDCCH monitoring parameters indicate disabling the monitoring of the PDCCH until a subsequent active portion associated with a subsequent DRX cycle.

In some examples of the method, apparatuses, and non-transitory computer-readable medium described herein, the one or more discontinuous PDCCH monitoring parameters indicate disabling the monitoring of the PDCCH based on determining whether a retransmission timer may be enabled or disabled.

Some examples of the method, apparatuses, and non-transitory computer-readable medium described herein may further include operations, features, means, or instructions for transmitting an uplink transmission during the active portion while disabling monitoring of the PDCCH.

In some examples of the method, apparatuses, and non-transitory computer-readable medium described herein, the uplink transmission includes a hybrid automatic repeat request (HARD) feedback, a channel state information (CSI) report, or a sounding reference signal (SRS) transmission.

Some examples of the method, apparatuses, and non-transitory computer-readable medium described herein may further include operations, features, means, or instructions for enabling an inactivity timer based on receiving a PDCCH during the active portion.

In some examples of the method, apparatuses, and non-transitory computer-readable medium described herein, the inactivity timer may be separate from the temporal period associated with the discontinuous monitoring of the PDCCH.

Some examples of the method, apparatuses, and non-transitory computer-readable medium described herein may further include operations, features, means, or instructions for determining that a C-DRX mode may be enabled for the UE, and terminating monitoring of the PDCCH before expiration of the inactivity timer.

A method of wireless communication at a base station is described. The method may include determining whether to enable or disable discontinuous monitoring of a PDCCH for a UE and transmitting a DCI message including an indication of whether discontinuous PDCCH monitoring is enabled or disabled for the UE during a temporal period in which at least one of PDSCH reception, downlink reference signal monitoring, uplink reference signal transmissions, and channel reporting are enabled.

An apparatus for wireless communication is described. The apparatus may include a processor, memory coupled with the processor, and instructions stored in the memory. The instructions may be executable by the processor to cause the apparatus to determine whether to enable or disable discontinuous monitoring of a PDCCH for a UE and transmit a DCI message including an indication of whether discontinuous PDCCH monitoring is enabled or disabled for the UE during a temporal period in which at least one of PDSCH reception, downlink reference signal monitoring, uplink reference signal transmissions, and channel reporting are enabled.

Another apparatus for wireless communication is described. The apparatus may include means for determining whether to enable or disable discontinuous monitoring of a PDCCH for a UE and transmitting a DCI message including an indication of whether discontinuous PDCCH monitoring is enabled or disabled for the UE during a temporal period in which at least one of PDSCH reception, downlink reference signal monitoring, uplink reference signal transmissions, and channel reporting are enabled.

A non-transitory computer-readable medium storing code for wireless communication at a base station is described. The code may include instructions executable by a processor to determine whether to enable or disable discontinuous monitoring of a PDCCH for a UE and transmit a DCI message including an indication of whether discontinuous PDCCH monitoring is enabled or disabled for the UE during a temporal period in which at least one of PDSCH reception, downlink reference signal monitoring, uplink reference signal transmissions, and channel reporting are enabled.

Some examples of the method, apparatuses, and non-transitory computer-readable medium described herein may further include operations, features, means, or instructions for determining that a C-DRX mode may be disabled for the UE, where transmitting the DCI message may be based on the C-DRX mode being disabled.

Some examples of the method, apparatuses, and non-transitory computer-readable medium described herein may further include operations, features, means, or instructions for determining a DRX cycle including an active portion and an inactive portion.

In some examples of the method, apparatuses, and non-transitory computer-readable medium described herein, the indication includes a DPMI.

Some examples of the method, apparatuses, and non-transitory computer-readable medium described herein may further include operations, features, means, or instructions for assigning a type associated with the DPMI, where the type corresponds to whether the UE may be to enable monitoring of the PDCCH during at least the active portion.

Some examples of the method, apparatuses, and non-transitory computer-readable medium described herein may further include operations, features, means, or instructions for assigning a DPMI field in the DCI message for downlink data transmission or uplink data transmission, or both, the DPMI field including an indication of whether discontinuous PDCCH monitoring may be enabled.

In some examples of the method, apparatuses, and non-transitory computer-readable medium described herein, the DPMI field corresponds to one or more discontinuous PDCCH monitoring parameters.

In some examples of the method, apparatuses, and non-transitory computer-readable medium described herein, the one or more discontinuous PDCCH monitoring parameters indicate to the UE to refrain from disabling the monitoring of the PDCCH during at least the active portion.

In some examples of the method, apparatuses, and non-transitory computer-readable medium described herein, the one or more discontinuous PDCCH monitoring parameters indicate the temporal period for the UE to disable the monitoring of the PDCCH during at least the active portion.

In some examples of the method, apparatuses, and non-transitory computer-readable medium described herein, the one or more discontinuous PDCCH monitoring parameters indicate for the UE to disable the monitoring of the PDCCH until a subsequent active portion associated with a subsequent DRX cycle.

In some examples of the method, apparatuses, and non-transitory computer-readable medium described herein, the one or more discontinuous PDCCH monitoring parameters indicate to the UE to disable the monitoring of the PDCCH based on an enabled or a disabled retransmission timer.

DETAILED DESCRIPTION

Figure 1:
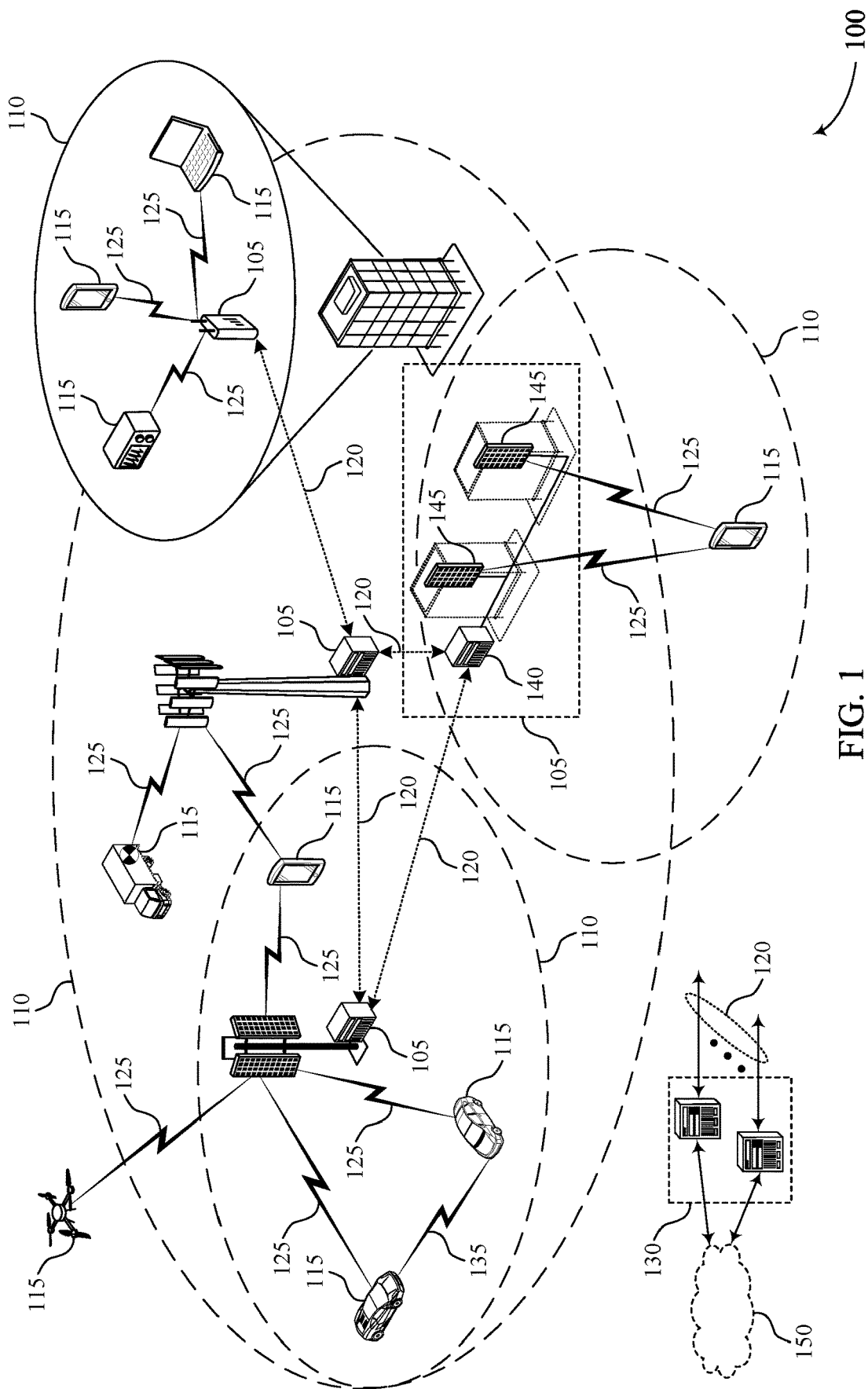
FIGS. 1 and 2 illustrate examples of wireless communications systems in accordance with aspects of the present disclosure.

Some wireless communication systems may include communication devices, such as user equipment (UE) and base stations, for example, eNodeBs (eNBs), next-generation NodeBs or giga-NodeBs (either of which may be referred to as a gNB) that may support multiple radio access technologies. Examples of radio access technologies include fourth generation (4G) systems such as Long-Term Evolution (LTE) systems and fifth generation (5G) systems which may be referred to as New Radio (NR) systems. A UE may support various types of applications that may have periodic or semi-periodic data traffic. The applications may be hosted by a server as described herein. The server may transmit the periodic or semi-periodic data traffic to a base station, which may forward the data traffic to the UE. The server may divide the data traffic into multiple slices (also referred to as files) and encode each slice separately, and transmit the encoded slices to the base station, which may forward the data traffic to the UE using multiple transport blocks (also referred to as a burst of transport blocks). Each burst of transport blocks may have a transmission delay.

The UE may benefit from the periodic or semi-periodic data traffic and the transmission delay between bursts of transport blocks carrying the periodic or semi-periodic data traffic to implement various operations to reduce power consumption. The UE may support connected mode discontinuous reception (CDRX) operations in which the UE may enter an active state (e.g., power-up during active portions (also referred to as ON durations) of a discontinuous reception (DRX) cycle) to monitor downlink channels (e.g., physical downlink control channels (PDCCH)) to receive the periodic or semi-periodic data traffic, as well as to enter an inactive state (e.g., power-down during inactive portions (also referred to as OFF durations) of a DRX cycle) and stop monitoring of the downlink channels (e.g., PDCCH). Although CDRX operations provide power savings for the UE, there may be conditions where CDRX operations may provide shortcomings for power savings for periodic or semi-periodic data traffic. For instance, an inactivity timer associated with CDRX operations may prevent the UE from entering an inactive state or may trigger the UEs to prematurely enter the inactive state, and thereby may have adverse effects on reception of the periodic or semi-periodic data traffic from the base station.

Various aspects of the described techniques relate to configuring the UE to provide power saving improvements by disabling monitoring of downlink channels, for example discontinuous monitoring of the PDCCH when operating in an active state. In some examples, the UE may provide discontinuous monitoring of the PDCCH during a temporal period based at least in part on a downlink control information (DCI) message transmitted from the network (e.g., a base station). The DCI message may include one or more DCI fields, which may indicate to the UE to disable monitoring of the PDCCH during a temporal period. The UE may be configured to provide discontinuous monitoring of the PDCCH during the temporal period. The UE may still perform radio resource control (RRC) configured operations, such as channel state information reference signals (CSI-RS) monitoring, CSI reporting, or sounding reference signal (SRS) transmission during the temporal period. In some examples, if there happens to be no RRC configured operations during the temporal period, then the UE may enter a lower power state, which may be similar to an inactive portion of a DRX cycle in term of power consumption.

In some other examples, the UE may be configured to support discontinuous monitoring of the PDCCH during a DRX cycle, which may include an active portion (also referred to as an ON duration) and an inactive portion (also referred to as an OFF duration). The temporal period may include or be a part of the inactive portion. When in the active portion of the DRX cycle, the UE may perform RRC configured operations, such as CSI-RS monitoring, CSI reporting, and SRS transmission. Alternatively, when in the inactive portion of the DRX cycle, the UE might not perform the RRC configured operations, such as CSI-RS monitoring, CSI reporting, and SRS transmission. The inactive portion of the DRX cycle may be trigged by a grant arrival for the data traffic or a DRX-related timer expiring, or both. The UE may thereby experience added power savings for periodic or semi-periodic data traffic during CDRX operations by disabling monitoring of the PDCCH during the active portion.

The techniques employed by the UEs may provide benefits and enhancements to the operation of the UEs. In some examples, operations performed by the UEs may provide power saving improvements to the UE. For example, configuring the UEs to disable monitoring of the PDCCH during a temporal period may reduce power consumption by the UEs. In some other examples, configuring the UEs to disable monitoring of the PDCCH during a temporal period may promote low latency wireless communications, among other benefits.

Aspects of the disclosure are initially described in the context of wireless communications systems. Aspects of the disclosure are further illustrated by and described with reference to apparatus diagrams, system diagrams, and flowcharts that relate to discontinuous downlink channel monitoring for wireless communications in wireless communications systems.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNB, a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). The more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Various aspects of the described techniques relate to configuring the UEs 115 to provide power saving improvements by disabling monitoring of downlink channels, for example discontinuous monitoring of physical channels, for example PDCCH when operating in an active state. In some examples, the UEs 115 may provide discontinuous monitoring of the PDCCH during a temporal period based at least in part on a DCI message transmitted from the network (e.g., a base station 105). The DCI message may include one or more DCI fields, which may indicate (e.g., a discontinuous PDCCH monitoring indication (DPMI)) to the UEs 115 to disable monitoring of the PDCCH during a temporal period. The UEs 115 may be configured to provide discontinuous monitoring of the PDCCH during the temporal period. The UEs may still perform RRC configured operations, such as CSI-RS monitoring, CSI reporting, or SRS transmission during the temporal period. In some examples, if there happens to be no RRC configured operations during the temporal period, then the UEs 115 may enter a lower power state, which may be similar to an inactive portion of a DRX cycle in term of power consumption.

In some examples, the DPMI may be a multi-group indication. For example, the base station 105-a may indicate a group-specific DMPI. The indication may include a field corresponding to one or more discontinuous downlink channel monitoring parameters. In some examples, each group-specific DMPI may correspond to a cell, for example, a component carrier either a primary cell or a secondary cell. The one or more discontinuous downlink channel parameters may correspond to the cell. In some other examples, each group-specific DMPI may correspond to a set of cells. The one or more discontinuous downlink channel parameters may correspond to the set of cells. In other examples, each group-specific DMPI may correspond to a DRX group (e.g., a set of DRX cycles). The one or more discontinuous downlink channel parameters may correspond to the DRX group. The base station 105-a and the UE 115-a may support discontinuous PDCCH monitoring in carrier aggregation deployments.

In some other examples, the UEs 115 may be configured to support discontinuous monitoring of the PDCCH during a DRX cycle, which may include an active portion (also referred to as an ON duration) and an inactive portion (also referred to as an OFF duration). The temporal period may include or be a part of the inactive portion. When in the active portion of the DRX cycle, the UEs 115 may perform RRC configured operations, such as CSI-RS monitoring, CSI reporting, or SRS transmission. Alternatively, when in the inactive portion of the DRX cycle, the UEs 115 might not perform the RRC configured operations, such as CSI-RS monitoring, CSI reporting, or SRS transmission. The inactive portion of the DRX cycle may be trigged by a grant arrival for the data traffic or a DRX-related timer expiring, or both. The UEs 115 may thereby experience added power savings for periodic or semi-periodic data traffic during CDRX operations by disabling monitoring of the PDCCH during the active portion. Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., a set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
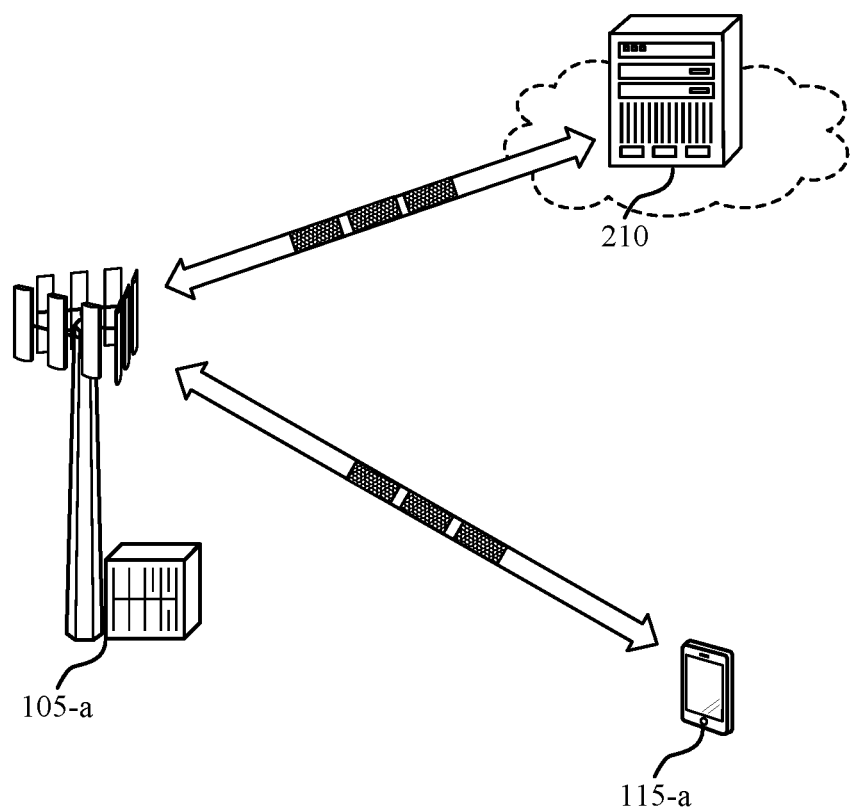

FIG. 2 illustrates an example of a wireless communications system 200 in accordance with aspects of the present disclosure. The wireless communications system 200 may implement or be implemented by aspects of the wireless communications system 100. For example, the wireless communications system 200 may include a base station 105-*a* and a UE 115-*a*, which may be examples of a base station 105 and a UE 115 as described herein. The wireless communications system 200 may support multiple radio access technologies including 4G systems such as LTE systems, LTE-A systems, or LTE-A Pro systems, and 5G systems, which may be referred to as NR systems. The wireless communications system 200 may include features for improvements to power savings and, in some examples, may promote high reliability and low latency wireless communications, among other benefits.

The base station 105-*a* and the UE 115-*a* may support various types of applications that may have periodic or semi-periodic data traffic 205. The base station 105-*a* may be in wireless communication with a server 210, which may provide the periodic or semi-periodic data traffic 205 to the base station 105-*a* to forward to the UE 115-*a*. The server 210 may be a cloud server, a server associated with an application subscription provider, proxy server, web server, application server, or any combination thereof. The server 210 may include an application distribution platform. The application distribution platform may allow the UE 115-*a* to discover, browse, share, and download applications via the base station 105-*a*, and provide a digital distribution of the application from the application distribution platform. As such, a digital distribution may be a form of delivering content such as data, without the use of physical media but over online delivery mediums, such as the Internet. For example, the UE 115-*a* may upload or download applications for streaming, downloading, uploading, or processing, data (e.g., images, audio, video). The server 210 may also transmit to the UE 115-*a* a variety of information, such as instructions or commands to download applications on the UE 115-*a* via the base station 105-*a*.

By way of example, the base station 105-*a* and the UE 115-*a* may support mixed reality (XR) applications, which may have periodic or semi-periodic XR data traffic. An XR application may support various frame rates, for example 60 MHz frame rates or 120 MHz frame rates. The server 210 may generate an XR frame at 60 MHz, which may correspond to a periodicity of 16.67 ms. Alternatively, the server 210 may generate an XR frame at 120 MHz, which may correspond to a periodicity of 8.33 ms. The server 210 may transmit the periodic or semi-periodic XR data traffic to the base station 105-*a*, which may forward the XR data traffic to the UE 115-*a*. The server 210 may divide the XR data traffic into multiple slices (also referred to as files) and encode each slice separately, and transmit the encoded slices to the base station 105-*a*, which may forward the XR data traffic to the UE 115-*a* using multiple transport blocks (also referred to as a burst of transport blocks). There may be, in some examples, a transmission delay between each burst of transport blocks.

The UE 115-*a* may benefit from the periodic or semi-periodic data traffic 205, including from the transmission delay between bursts of transport blocks carrying the periodic or semi-periodic data traffic 205 to implement various operations to reduce power consumption. For example, the UE 115-*a* may support CDRX operations in which the UE 115-*a* may enter an active state (e.g., power-up during active durations (also referred to as active portions) of a DRX cycle) to monitor downlink channels (e.g., PDCCH) to receive the periodic or semi-periodic data traffic 205, as well as to enter an inactive state (e.g., power-down during inactive durations (also referred to as inactive portions) of a DRX cycle) and stop monitoring of the downlink channels (e.g., PDCCH). Although CDRX operations provide power savings for the UE 115-a, there may be conditions where CDRX operations may provide shortcomings for power savings for the UE 115-a. For instance, an inactivity timer associated with CDRX operations may prevent the UE 115-a from entering an inactive state or may trigger the UE 115-a to prematurely enter the inactive state, and thereby may have impact on reception of the periodic or semi-periodic data traffic 205.

The UE 115-a may provide improvements to power saving at the UE 115-a by enabling discontinuous monitoring of downlink channels, for example disabling monitoring of downlink channels when operating in an active state. The UE 115-a may enable or disable the monitoring of the PDCCH autonomously or based on a received indication (also referred to as a discontinuous PDCCH monitoring indication (DPMI)) from the base station 105-a. The indication may include a field corresponding to one or more discontinuous downlink channel monitoring parameters. The one or more discontinuous downlink channel parameters may indicate to refrain from disabling the monitoring of the downlink channel during a temporal period (e.g., an active duration of a DRX cycle). In some examples, the one or more discontinuous downlink channel parameters may indicate a temporal period for disabling the monitoring of the downlink channels. In some other examples, the one or more discontinuous downlink channel parameters may indicate disabling the monitoring of the downlink channels until a subsequent active duration associated with a subsequent DRX cycle, or disabling the monitoring of the downlink channels based on determining whether a retransmission timer is enabled or disabled.

In some examples, the DPMI may be a multi-group indication. For example, the base station 105-a may indicate a group-specific DMPI. The indication may include a field corresponding to one or more discontinuous downlink channel monitoring parameters. In some examples, each group-specific DMPI may correspond to a cell, for example, a component carrier either a primary cell or a secondary cell. The one or more discontinuous downlink channel parameters may correspond to the cell. In some other examples, each group-specific DMPI may correspond to a set of cells. The one or more discontinuous downlink channel parameters may correspond to the set of cells. In other examples, each group-specific DMPI may correspond to a DRX group (e.g., a set of DRX cycles). The one or more discontinuous downlink channel parameters may correspond to the DRX group. The base station 105-a and the UE 115-a may support discontinuous PDCCH monitoring in carrier aggregation deployments.

The UE 115-a may disable monitoring downlink channels during a temporal period while still continuing to perform other wireless communication operations, such as PDSCH reception, downlink reference signal monitoring, uplink reference signal transmissions, and channel reporting. In some other examples, the UE 115-a may disable monitoring downlink channels during an active duration of a DRX cycle while still continuing to perform other wireless communication operations, such as PDSCH reception, downlink reference signal monitoring, uplink reference signal transmissions, and channel reporting. The UE 115-a may thereby experience added power savings by enabling discontinuous monitoring of downlink channels during a temporal period. By configuring the UE 115-a to disable monitoring of the PDCCH during a temporal period, the UE 115-a may reduce power consumption. Additionally or alternatively, configuring the UE 115-a to disable monitoring of the PDCCH during a temporal period may promote low latency wireless communications, among other benefits.

Figure 3:
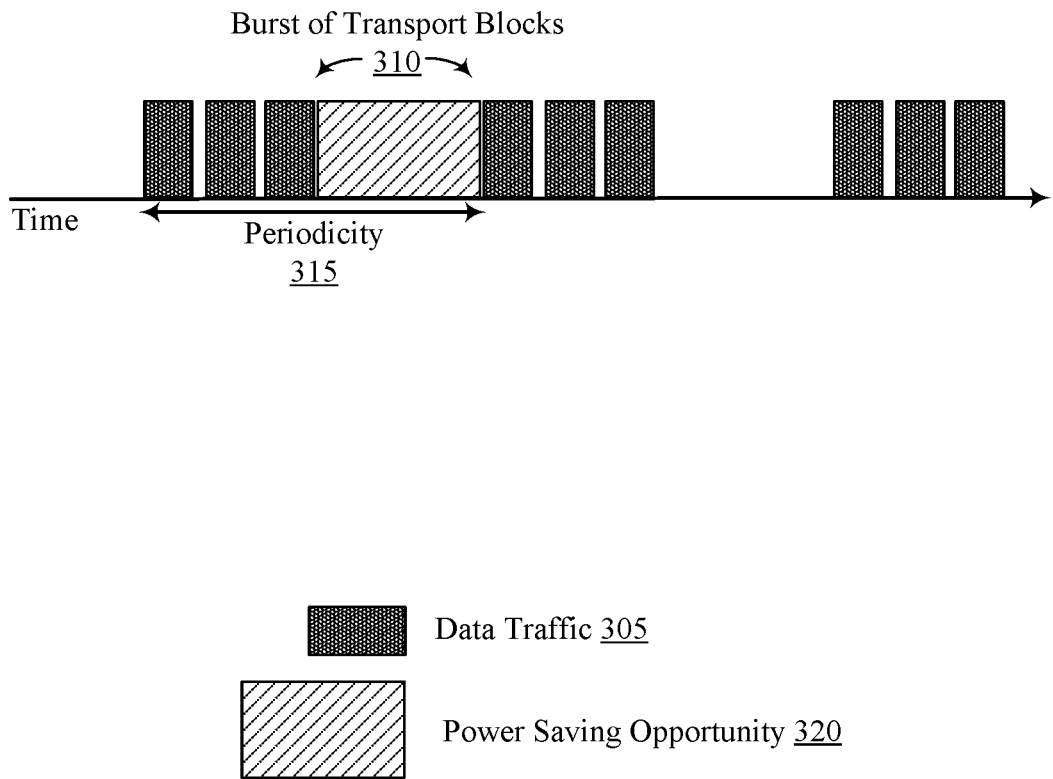
FIG. 3 illustrates an example of a timeline in accordance with aspects of the present disclosure.

FIG. 3 illustrates an example of a timeline 300 in accordance with aspects of the present disclosure. The timeline 300 may implement or be implemented by aspects of the wireless communications system 100 and 200 as described with reference to FIGS. 1 and 2, respectively. The timeline 300 may be based on a configuration by a base station 105 or a UE 115, and implemented by the UE 115 to reduce power consumption for the UE 115. The timeline 300 may also be based on a configuration by the base station 105 or the UE 115, and implemented by the UE 115 to promote high reliability and low latency wireless communications in a wireless communications system, among other benefits. In the example of FIG. 3, the UE 115 may receive data traffic 305 over a burst of transport blocks 310. The data traffic 305 may be semi-periodic or periodic. For example, there may be a periodicity 315 between two consecutive bursts of transport blocks 310. The UE 115 may determine a power saving opportunity 320, based at least in part on the periodicity 315 between the two consecutive bursts of transport blocks 310, to experience added power savings. The UE 115 may disable monitoring of a downlink channel, such as a PDCCH for the data traffic 305 during the power saving opportunity 320, but may still perform other wireless operations, such as PDSCH reception, downlink reference signal monitoring, uplink reference signal transmissions, and channel reporting (e.g., CSI reporting) during the power saving opportunity 320.

Figure 4A:
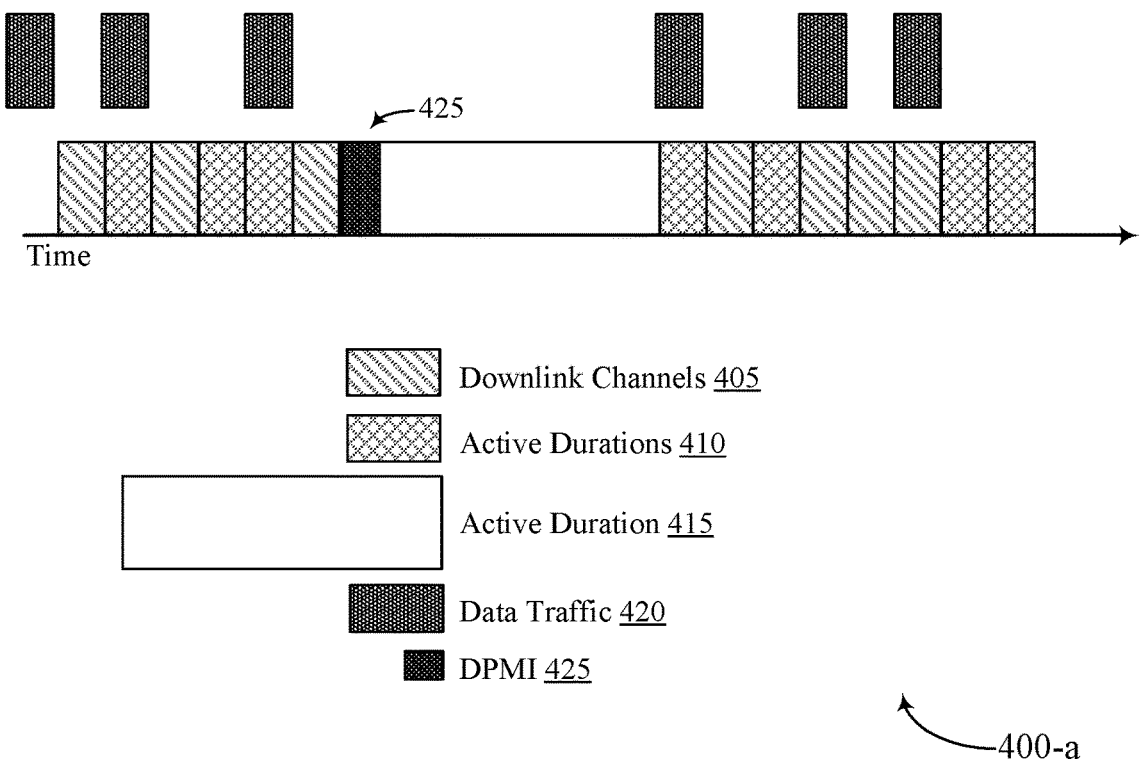
FIGS. 4A and 4B illustrate examples of timelines in accordance with aspects of the present disclosure.

FIG. 4A illustrates an example of a timeline 400-a in accordance with aspects of the present disclosure. The timeline 400-a may implement or be implemented by aspects of the wireless communications system 100 and 200 described with reference to FIGS. 1 and 2, respectively. The timeline 400-a may be based on a configuration by a base station 105 or a UE 115, and implemented by the UE 115 to decrease power consumption for the UE 115. The timeline 400-a may also be based on a configuration by the base station 105 or the UE 115, and implemented by the UE 115 to promote high reliability and low latency wireless communications in a wireless communications system, among other benefits.

With reference to the timeline 400-a, the base station 105 may transmit downlink channels 405 to the UE 115. The downlink channels 405 may include PDCCH or PDSCH, or a combination thereof. The PDCCH may schedule a burst of transport blocks carrying the data traffic 420 in the PDSCH. In some examples, the data traffic 420 may be semi-periodic or periodic. For example, the data traffic 420 may be XR data traffic, and in some examples, may be an XR frame segmented into multiple XR slices. The base station 105 may transmit, and the UE 115 may receive, a single transport block or a burst of transport blocks carrying the data traffic 420 on downlink channels 405 during a temporal period, for example, an active duration of a DRX cycle.

The timeline 400-a may include one or multiple active durations 410, which may be one or multiple time slots, in which the UE 115 monitors the one or multiple downlink channels 405 to receive the data traffic 420. In some examples, the one or multiple active durations 410 may be part of an active duration of a DRX cycle, and the UE 115 may monitor the one or multiple downlink channels 405 during the active duration. Additionally or alternatively, the timeline 400-a may include an active duration 415, which may be one or more active time slots in which the UE 115 does not monitor the one or multiple downlink channels 405 for the data traffic 420.

The base station 105 may transmit, and the UE 115 may receive, the data traffic 420 according to a periodicity associated with the data traffic 420. In some examples, there may be a delay between two transmissions of the data traffic 420. For example, the base station 105 may transmit, and the UE 115 may receive, the data traffic 420 at a first time and then the base station 105 may transmit, and the UE 115 may receive, the data traffic 420 at a second time. The difference between the first time and the second time may be the delay between the two transmissions of the data traffic 420. Because the data traffic 420 can be semi-periodic or periodic as described herein, the UE 115 may benefit from this, and may implement various operations to reduce power consumption.

In the example of FIG. 4A, a DRX mode (e.g., a CDRX mode) may be disabled. The base station 105 may transmit a message including a DPMI 425 to the UE 115. With the DRX mode disabled, the DPMI 425 may trigger the UE 115 to perform discontinuous monitoring of the one or more downlink channels 405, such as a PDCCH to reduce power consumption. For example, the UE 115 may disable monitoring the PDCCH of the one or more downlink channels 405 during the active duration 415. Although monitoring the PDCCH of the one or more downlink channels 405 during the active duration 415 is disabled, PDSCH reception, downlink reference signal monitoring, uplink reference signal transmissions, and channel reporting may still be enabled during the active duration 415. That is, the UE 115 may still perform PDSCH reception, downlink reference signal monitoring (e.g., demodulation reference signal (DMRS) monitoring), uplink reference signal transmissions (e.g., SRS transmissions), and channel reporting (e.g., CSI reporting) during the active duration 415. The UE 115 may thereby experience added power savings for periodic or semi-periodic data traffic 420 by disabling monitoring the PDCCH of the one or more downlink channels 405 during the active duration 415, in which the UE 115 does not expect the data traffic 420 from the base station 105. In other words, the UE 115 may remain in an active state and reduce power consumption.

Figure 4B:
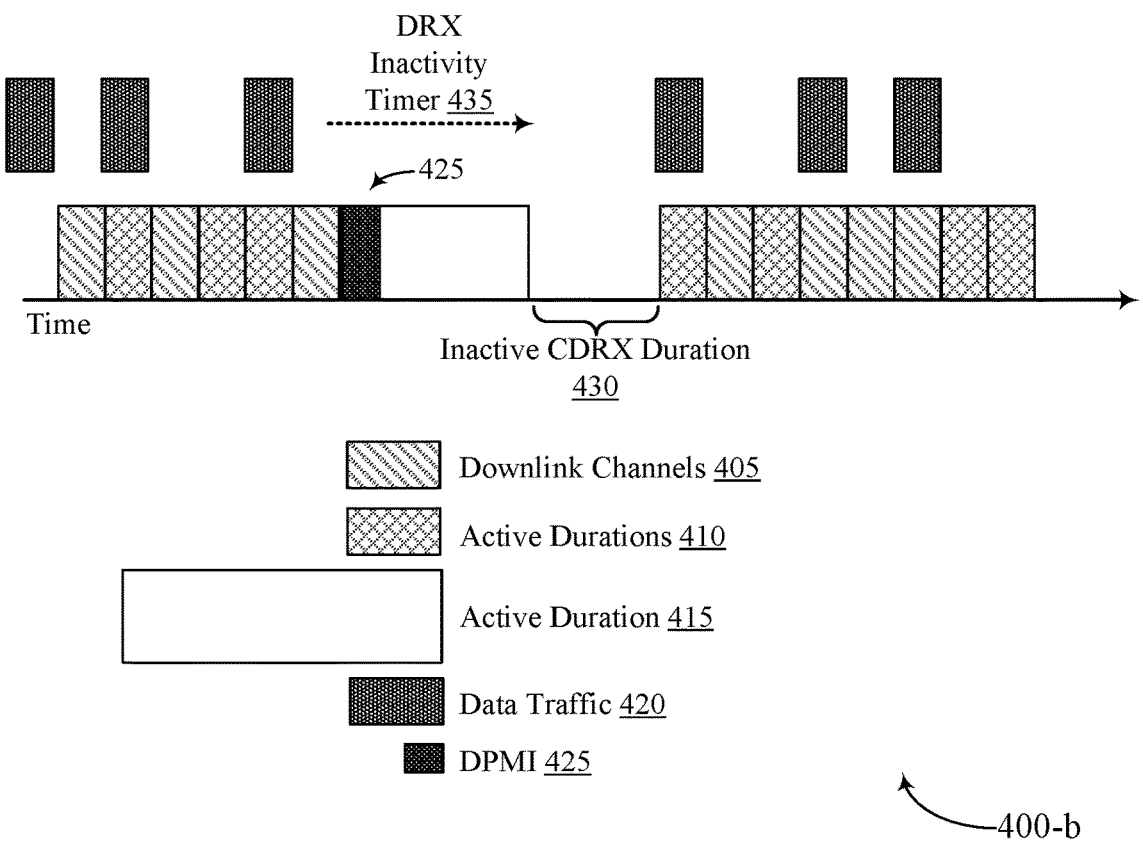

FIG. 4B illustrates an example of a timeline 400-b in accordance with aspects of the present disclosure. The timeline 400-b may implement or be implemented by aspects of the wireless communications system 100 and 200 described with reference to FIGS. 1 and 2, respectively. The timeline 400-b may be based on a configuration by a base station 105 or a UE 115, and implemented by the UE 115 to decrease power consumption for the UE 115. The timeline 400-b may also be based on a configuration by the base station 105 or the UE 115, and implemented by the UE 115 to promote high reliability and low latency wireless communications in a wireless communications system, among other benefits.

With reference to the timeline 400-b, the base station 105 may transmit downlink channels 405 to the UE 115. The downlink channels 405 may include PDCCH or PDSCH, or a combination thereof. The PDCCH may schedule one or a burst of transport blocks carrying the data traffic 420 in the PDSCH. In some examples, the data traffic 420 may be semi-periodic or periodic as described herein. For example, the data traffic 420 may be XR data traffic, and in some examples, may be an XR frame segmented into multiple XR slices. The base station 105 may transmit, and the UE 115 may receive, multiple bursts of transport blocks carrying the data traffic 420 on downlink channels 405 during an active duration, for example, an active portion of a DRX cycle.

The timeline 400-b may include one or multiple active durations 410, which may be one or multiple time slots in which the UE 115 monitors the one or multiple downlink channels 405 to receive the data traffic 420. The one or multiple active durations 410 may be part of an active duration of a DRX cycle, and the UE 115 may monitor the PDCCH of the one or multiple downlink channels 405 during the active duration. Additionally or alternatively, the timeline 400-b may include an active duration 415, which may be one or more active time slots in which the UE 115 does not monitor the PDCCH of the one or multiple downlink channels 405 for the data traffic 420.

The base station 105 may transmit, and the UE 115 may receive, the data traffic 420 according to a periodicity associated with the data traffic 420. In some examples, there may be a delay between two transmissions of the data traffic 420. For example, the base station 105 may transmit, and the UE 115 may receive, the data traffic 420 at a first time and then the base station 105 may transmit, and the UE 115 may receive, the data traffic 420 at a second time. The difference between the first time and the second time may be the delay between the two transmissions of the data traffic 420. Due to the data traffic 420 being semi-periodic or periodic as described herein, the UE 115 may implement various operations to reduce power consumption.

In the example of FIG. 4B, a DRX mode (e.g., a CDRX mode) may be enabled. The base station 105 may transmit a message including a DPMI 425 to the UE 115. With the DRX mode enabled, the DPMI 425 may trigger the UE 115 to perform discontinuous monitoring of the PDCCH of the one or more downlink channels 405 for power saving. For example, the UE 115 may disable monitoring the PDCCH of the one or more downlink channels 405 during the active duration 415. The DPMI 425 may also trigger the UE 115 to disable monitoring the PDCCH of the one or more downlink channels 405, for example, before a DRX inactivity timer 435 lapses. The DRX inactivity timer 435 may define a duration that the UE 115 should remain in an active state after reception of the PDCCH of the one or more downlink channels 405. That is, the DRX inactivity timer 435 specifies how long the UE 115 should remain 'ON' after the reception of a PDCCH. The DRX inactivity timer 435 might not be affected by the DPMI 425. In some examples, the UE 115 may remain in an active state while the DRX inactivity timer 435 is running.

By triggering the UE 115 to disable monitoring the PDCCH of the one or more downlink channels 405 during the active duration 415, the UE 115 may experience added power saving during DRX operation. For example, the UE 115 may disable monitoring the PDCCH of the one or more downlink channels 405 during the active CDRX duration. In some cases, the UE 115 may still perform PDSCH reception, downlink reference signal monitoring, uplink reference signal transmissions, and channel reporting (e.g., CSI reporting) during the active duration 415. The UE 115 may thereby experience added power savings for periodic or semi-periodic data traffic 420 by enabling discontinuous monitoring the PDCCH of the one or more downlink channels 405 during the active duration 415. In other words, the UE 115 may remain in an active state and experience reduced power consumption. The discontinuous monitoring of the PDCCH of the downlink channels 405 may be used both when DRX is enabled or disabled.

Figure 5:
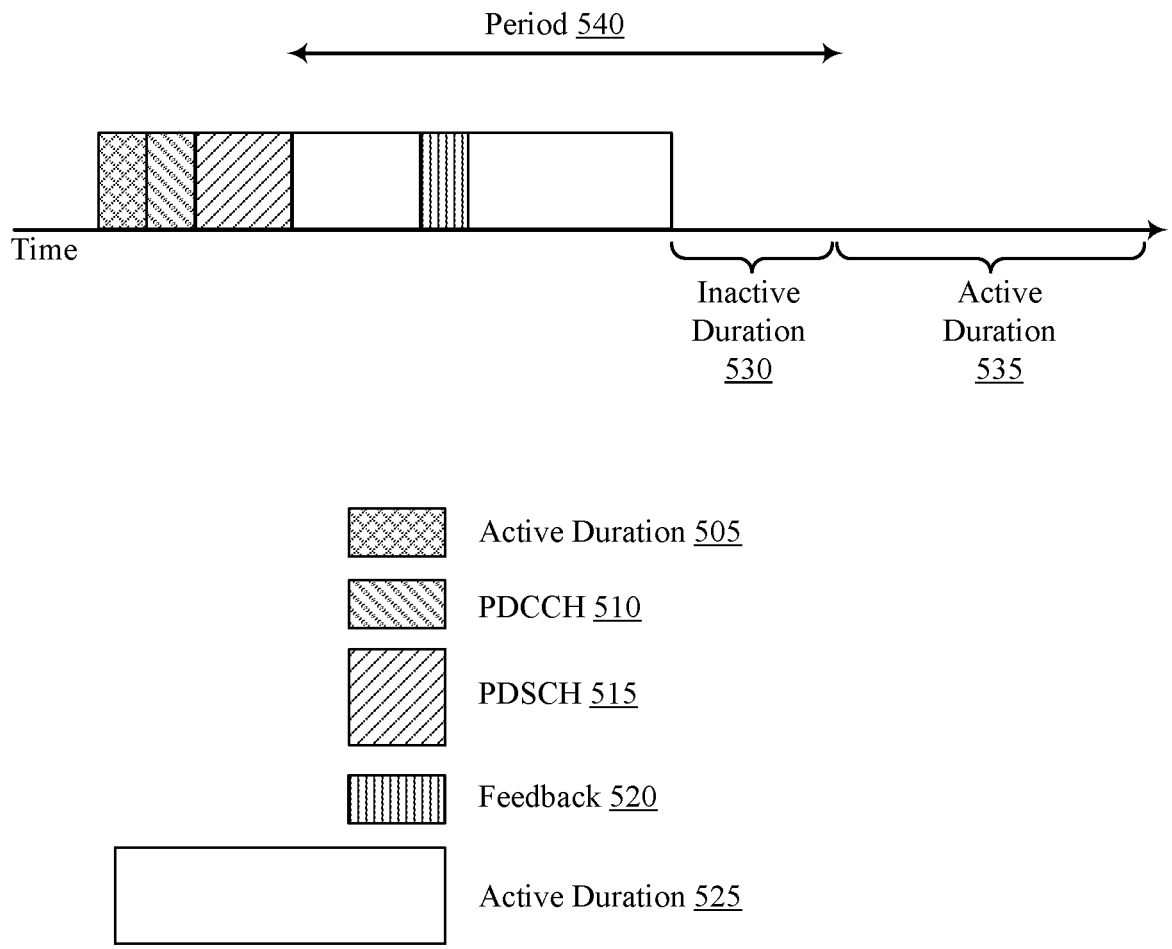
FIGS. 5 through 7 illustrate examples of timelines in accordance with aspects of the present disclosure.

FIG. 5 illustrates an example of a timeline 500 in accordance with aspects of the present disclosure. The timeline 500 may implement or be implemented by aspects of the wireless communications system 100 and 200 described with reference to FIGS. 1 and 2, respectively. The timeline 500 may be based on a configuration by a base station 105 or a UE 115, and implemented by the UE 115 to decrease power consumption for the UE 115. The timeline 500 may also be based on a configuration by the base station 105 or the UE 115, and implemented by the UE 115 to promote high reliability and low latency wireless communications in a wireless communications system, among other benefits.

The UE 115 may monitor downlink channels carrying data traffic during an active duration. While in the active duration, the UE 115 may be in an active state (e.g., a transceiver of the UE 115 may be powered ON). Likewise, the UE 115 may not monitor the downlink channels during an inactive duration of the DRX cycle. While in the inactive duration, the UE 115 may be in an inactive state (e.g., a transceiver of the UE 115 may be powered OFF) for power saving. With reference to FIG. 5, the UE 115 may receive downlink channels during an active duration 505. The downlink channels may include a PDCCH 510 or a PDSCH 515, or a combination thereof. The PDCCH 510 or the PDSCH 515, or a combination thereof, may carry one or a burst of transport blocks carrying data traffic. In some examples, the data traffic may be semi-periodic or periodic as described herein. For example, the data traffic may be XR data traffic, and in some examples, may be an XR frame segmented into multiple XR slices. The base station 105 may transmit, and the UE 115 may receive, one or a burst of transport blocks carrying the data traffic on downlink channels during the active duration 505.

The PDCCH 510 may carry a DCI message including a DPMI. The UE 115 may determine a type associated with the DPMI and determine whether to disable monitoring of the PDCCH 510 during at least an active duration 525 based on the identified type associated with the DPMI. The UE 115 may determine that the type associated with the DPMI corresponds to a first type and may thereby disable monitoring of the PDCCH 510 during the active duration 525 until a next active duration. For example, the UE 115 may disable monitoring of the PDCCH 510 during the active duration 525 until the active duration 535 following the inactive duration 530. In some examples, the active duration 525 may be a portion of the active duration 505 of a DRX cycle. Alternatively, the UE 115 may determine a period 540 for disabling monitoring of the PDCCH 510 based on the identified type associated with the DPMI. The period 540 may include the active duration 525 in which the UE 115 does not monitor the PDCCH 510 according to the DMPI and the inactive duration 530. The UE 115 may disable monitoring of the PDCCH 510 during the period 540. The period 540 may be a configured duration (e.g., via an RRC configuration message). In some examples, if a previous PDCCH prior to the period 540 scheduled a PDSCH which falls within the period 540 (e.g., is received during the period 540), the UE 115 may still receive the PDSCH during the period 540.

The UE 115 may transmit, to the base station 105, a feedback 520 during the active duration 525. The feedback 520 may be a HARQ feedback (e.g., a positive acknowledgment or a negative acknowledgment). In some other examples, the UE 115 may transmit, to the base station 105, a CSI report during the active duration 525. The CSI report may include CSI parameters, such as a channel quality indicator (CQI), a precoding matrix indicator (PMI), or a CSI reference signal (CSI-RS) indicator (CRI). In some other examples, the one or more CSI parameters may additionally or alternatively include one or more of a synchronization signal physical broadcast channel (SS/PBCH) block resource indicator (SSBRI), a layer indicator (LI), a rank indicator (RI), or a layer one reference signal received power (L1-RSRP). In other examples, the UE 115 may transmit an uplink reference signal, such as a sounding reference signal (SRS) to the base station 105 during the active duration 525, which the base station 105 may use to estimate an uplink channel quality between the base station 105 and the UE 115. While monitoring the PDCCH 510 during the active duration 525 is disabled, PDSCH reception, downlink reference signal monitoring, uplink reference signal transmissions, and channel reporting may still be enabled during the active duration 525 for the UE 115.

Figure 6:
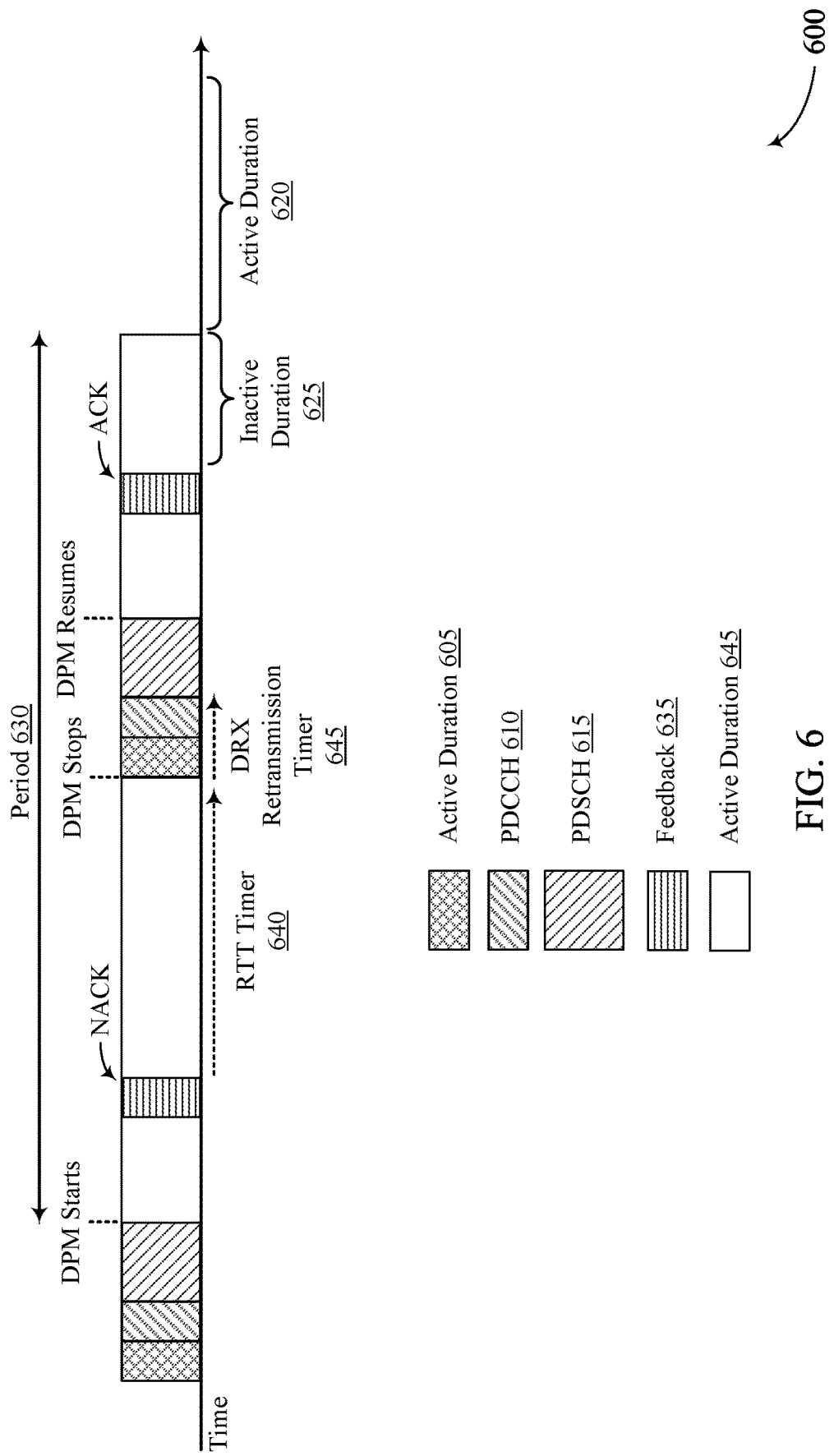

FIG. 6 illustrates an example of a timeline 600 in accordance with aspects of the present disclosure. The timeline 600 may implement or be implemented by aspects of the wireless communications system 100 and 200 described with reference to FIGS. 1 and 2, respectively. The timeline 600 may be based on a configuration by a base station 105 or a UE 115, and implemented by the UE 115 to decrease power consumption for the UE 115. The timeline 600 may also be based on a configuration by the base station 105 or the UE 115, and implemented by the UE 115 to promote high reliability and low latency wireless communications in a wireless communications system, among other benefits.

The UE 115 may operate in a DRX mode. In the DRX mode, the UE 115 may monitor downlink channels carrying data traffic during an active duration of a DRX cycle. While in the active duration, the UE 115 may be in an active state (e.g., a receiver or a transmitter, or both, of the UE 115 may be powered ON). Likewise, the UE 115 may not monitor the downlink channels during an inactive duration of the DRX cycle. While in the inactive duration, the UE 115 may be in an inactive state (e.g., a receiver or a transmitter, or both, of the UE 115 may be powered OFF) for reduced power consumption.

With reference to FIG. 6, the UE 115 may receive downlink channels during an active duration 605. The downlink channels may include a PDCCH 610 or a PDSCH 615, or a combination thereof. The PDCCH 610 or the PDSCH 615, or a combination thereof, may carry one or a burst of transport blocks carrying data traffic. In some examples, the data traffic may be semi-periodic or periodic as described herein. For example, the data traffic may be XR data traffic, and in some examples, may be an XR frame segmented into multiple XR slices. The base station 105 may transmit, and the UE 115 may receive, one or a burst of transport blocks carrying the data traffic on downlink channels during the active duration 605 of a DRX cycle.

The PDCCH 610 may carry a DCI message including a DPMI. The UE 115 may determine a type associated with the DPMI and determine whether to enable discontinues monitoring of the PDCCH 610 during at least an active duration 605 based on the identified type associated with the DPMI. The active duration 605 may be a portion of a DRX cycle, for example. The UE 115 may determine that the type associated with the DPMI corresponds to a second type. The UE 115 may disable monitoring of the PDCCH 610 during the active duration 605 until a next active duration 620 following an inactive duration 625 of a DRX cycle. Alternatively, the UE 115 may determine a period 630 for disabling monitoring of the PDCCH 610 based on the second type associated with the DPMI. The UE 115 may disable monitoring of the PDCCH 610 during the period 630.

The UE 115 may, in some examples, disable monitoring of the PDCCH 610 exclusively when a retransmission timer (e.g., a DRX retransmission timer) is not running. The UE 115 may transmit, to the base station 105, a feedback 635 during the active duration 605. The feedback 635 may be a HARQ feedback (e.g., a positive acknowledgment or a negative acknowledgment). While monitoring the PDCCH 610 during the active duration 605, feedback reporting for the UE 115 may still be enabled during the active duration 605. In the example of FIG. 6, the feedback 635 may be a negative acknowledgment associated with a transport block or a burst of transport blocks carried by the PDSCH 615 scheduled by the PDCCH 610. As a result, a retransmission of the transport block or the burst of transport blocks carried by the PDSCH 615 scheduled by the PDCCH 610 may occur based on the feedback 635.

In some examples, the UE 115 may enable a round trip timer (RTT) timer 640. While the RTT timer 640 is running, the UE 115 may keep disabling monitoring of the PDCCH 610 according to the DMPI. In some examples, the UE 115 may enable a DRX retransmission timer 645 if the UE 115 has transmitted a negative acknowledgement to the base station 105, which may define a duration the UE 115 may await an incoming retransmission from the base station 105. The retransmission may be of the transport block or the burst of transport blocks carried by the PDSCH 615 scheduled by the PDCCH 610 previously not received. The UE 115 may enable monitoring of the PDCCH 610 during a portion of the active duration 605 based on the DRX retransmission timer 645 and disabling monitoring of the PDCCH 610 during the active duration 650 when the DRX retransmission timer 645 is not running. Based on receiving a DPMI, the UE 115 may determine whether a retransmission timer is running and enable or disable monitoring of the PDCCH 610. The UE 115 may begin, pause, and resume discontinuous monitoring of a PDCCH based at least in part on whether an RTT timer or a DRX retransmission timer is running or not running.

Figure 7:
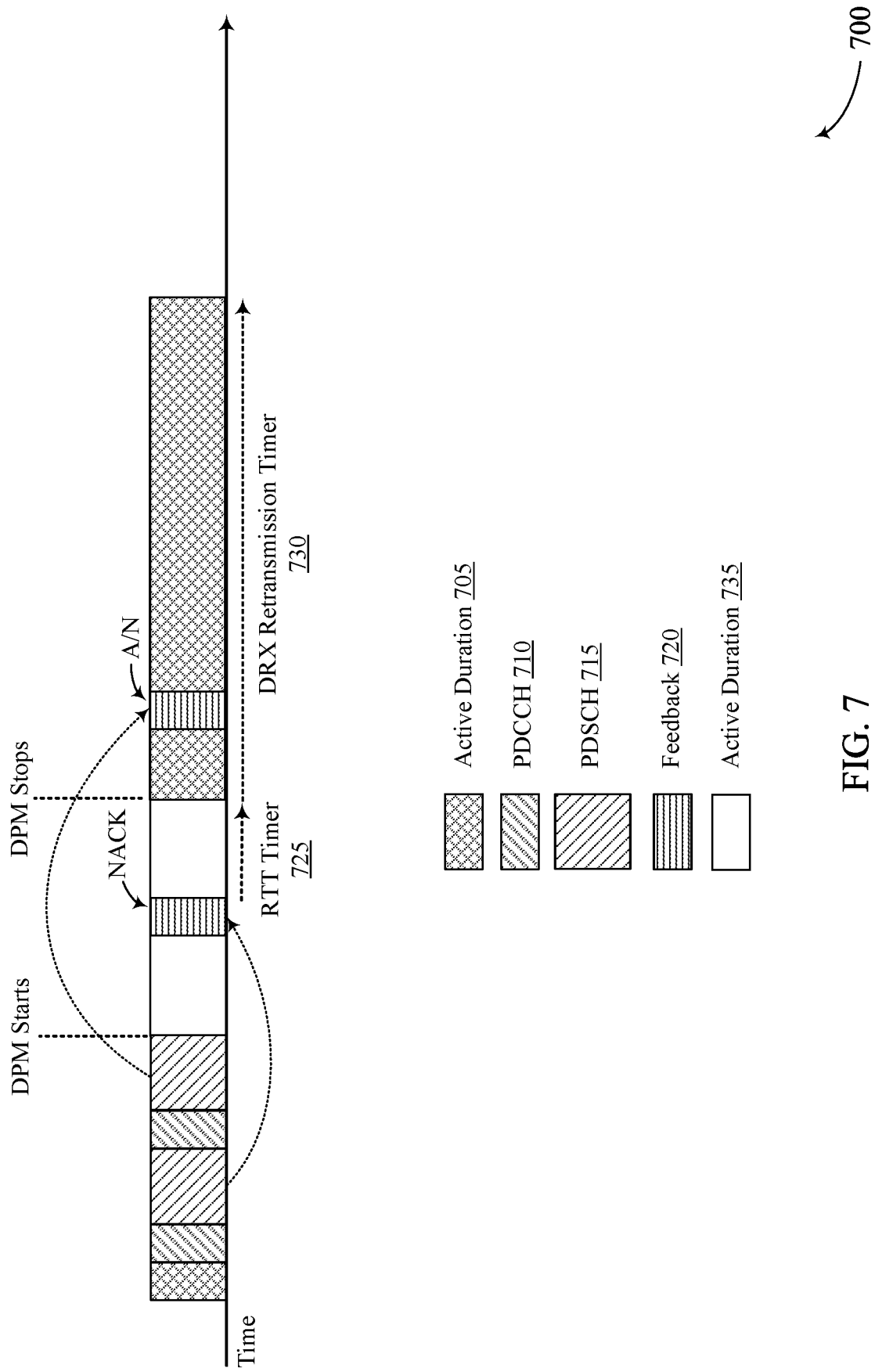

FIG. 7 illustrates an example of a timeline 700 in accordance with aspects of the present disclosure. The timeline 700 may implement or be implemented by aspects of the wireless communications system 100 and 200 described with reference to FIGS. 1 and 2, respectively. The timeline 700 may be based on a configuration by a base station 105 or a UE 115, and implemented by the UE 115 to decrease power consumption for the UE 115. The timeline 700 may also be based on a configuration by the base station 105 or the UE 115, and implemented by the UE 115 to promote high reliability and low latency wireless communications in a wireless communications system, among other benefits.

The UE 115 may operate in a DRX mode. In the DRX mode, the UE 115 may monitor downlink channels carrying data traffic during an active duration of a DRX cycle. While in the active duration, the UE 115 may be in an active state (e.g., a transceiver of the UE 115 may be powered ON). Likewise, the UE 115 may not monitor the downlink channels during an inactive duration of the DRX cycle. While in the inactive duration, the UE 115 may be in an inactive state (e.g., a transceiver of the UE 115 may be powered OFF) for decreased power consumption. With reference to FIG. 7, the UE 115 may receive downlink channels during an active duration 705. The downlink channels may include multiple PDCCH 710 or multiple PDSCH 715, or a combination thereof. The multiple PDCCH 710 or the multiple PDSCH 715, or a combination thereof, may carry a burst of transport blocks carrying data traffic. In the example of FIG. 7, the base station 105 may transmit, and the UE 115 may receive, multiple bursts of transport blocks carrying data traffic on downlink channels during the active duration 705 of a DRX cycle. The multiple bursts of transport blocks may also correspond to multiple feedback processes (e.g., multiple feedback 720).

The UE 115 may enable an RTT timer 725, which may define a period before a feedback retransmission is expected by the UE 115 as described in FIG. 6, respectively. For example, a retransmission may occur for a first PDSCH 715 scheduled by a first PDCCH 710. In some examples, the UE 115 may enable a DRX retransmission timer 730, which may define a period the UE 115 may remain in an active state to await an incoming retransmission from the base station 105. The retransmission may be of the burst of transport blocks carried by the first PDSCH 715, scheduled by the first PDCCH 710, previously not received. The UE 115 may enable monitoring of the PDCCH 710 during a portion (e.g., active duration 735) of the active duration 705 based on the DRX retransmission timer 730. Based on receiving a DPMI, the UE 115 may determine whether a retransmission timer is running and enable monitoring of the PDCCH 710 for scheduling one or multiple retransmissions of the burst of transport blocks carried by the PDSCH 715 if the retransmission timer is running. If the UE 115 received a DMPI to indicate disabling monitoring of the PDCCH and the retransmission timer is not running, the UE 115 may disable monitoring the PDCCH in the active duration 735. The UE 115 may begin and end discontinuous monitoring of a PDCCH based at least in part on whether an RTT timer or a DRX retransmission timer is running or not running.

Figure 8:
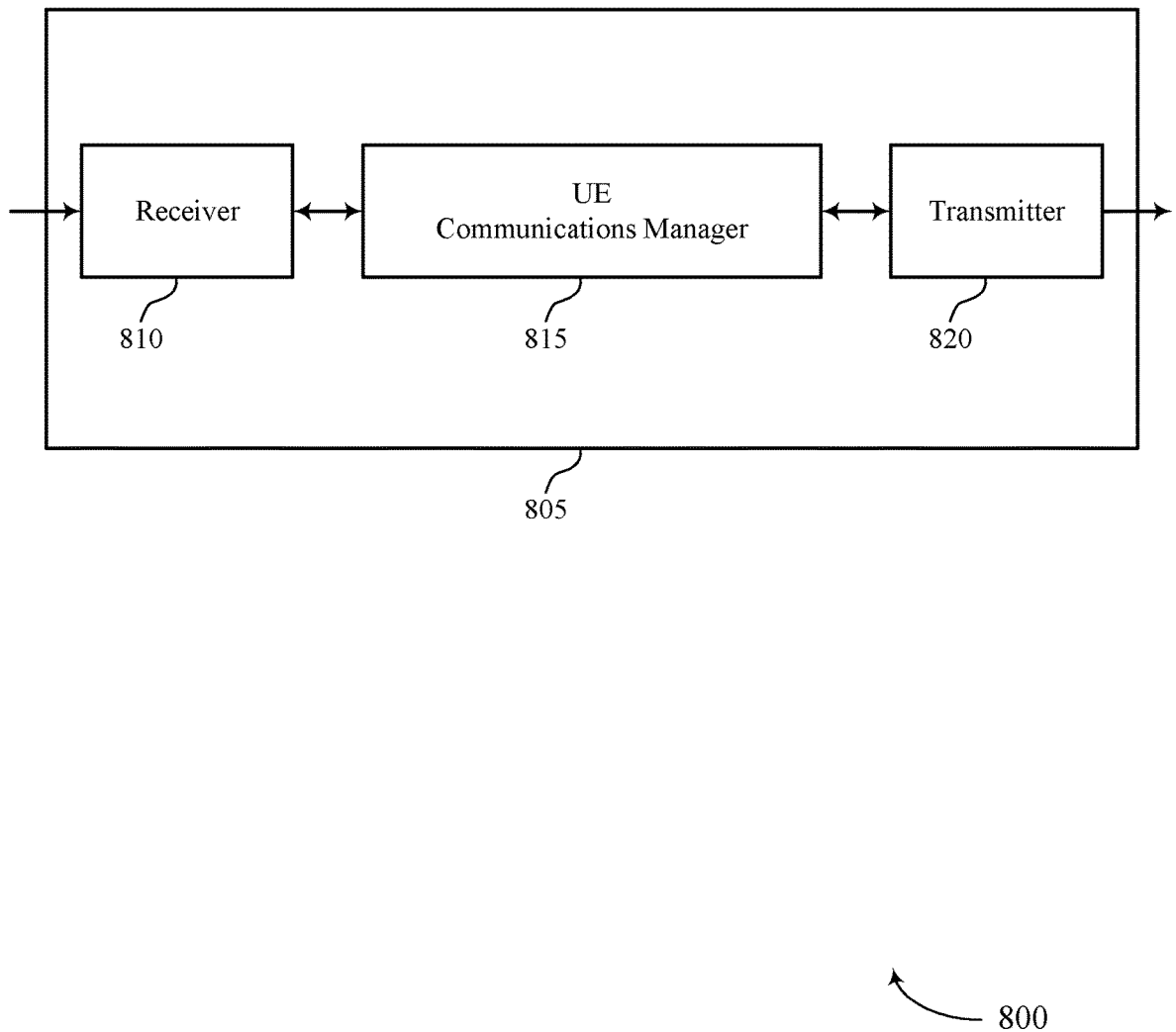
FIGS. 8 and 9 show block diagrams of devices in accordance with aspects of the present disclosure.

FIG. 8 shows a block diagram 800 of a device 805 in accordance with aspects of the present disclosure. The device 805 may be an example of aspects of a UE 115 as described herein. The device 805 may include a receiver 810, a UE communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to discontinuous downlink channel monitoring). Information may be passed on to other components of the device 805. The receiver 810 may be an example of aspects of the transceiver 1120 described with reference to FIG. 11. The receiver 810 may utilize a single antenna or a set of antennas.

The UE communications manager 815 may receive a DCI message including an indication to enable discontinuous monitoring of a PDCCH, enable the discontinuous monitoring of the PDCCH based on the received DCI message, and disable monitoring of the PDCCH during a temporal period in which at least one of PDSCH reception, downlink reference signal monitoring, uplink reference signal transmissions, and channel reporting is enabled. The UE communications manager 815 may be an example of aspects of the UE communications manager 1110 described herein.

The UE communications manager 815 may be implemented as an integrated circuit or chipset for a modem, and the receiver 810 and the transmitter 820 may be implemented as analog components (e.g., amplifiers, filters, antennas) coupled with the modem to enable wireless transmission and reception for the device 805. The UE communications manager 815 as described herein may be implemented to realize one or more potential advantages. Various implementations may enable power saving for the device 805. At least one implementation may enable the UE communications manager 815 to effectively disable monitoring of a PDCCH during a temporal period while performing other wireless operations CSI-RS monitoring, CSI reporting, or SRS transmissions. At least one implementation may enable the UE communications manager 815 to disable monitoring of a PDCCH during an active portion of a DRX cycle.

The UE communications manager 815, or its sub-components, may be implemented in hardware, code (e.g., software or firmware) executed by a processor, or any combination thereof. If implemented in code executed by a processor, the functions of the UE communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 815, or its sub-components, may be physically located at various positions, including being distributed such that portions of functions are implemented at different physical locations by one or more physical components. In some examples, the UE communications manager 815, or its sub-components, may be a separate and distinct component in accordance with various aspects of the present disclosure. In some examples, the UE communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver component. For example, the transmitter 820 may be an example of aspects of the transceiver 1120 described with reference to FIG. 11. The transmitter 820 may utilize a single antenna or a set of antennas.

Figure 9:
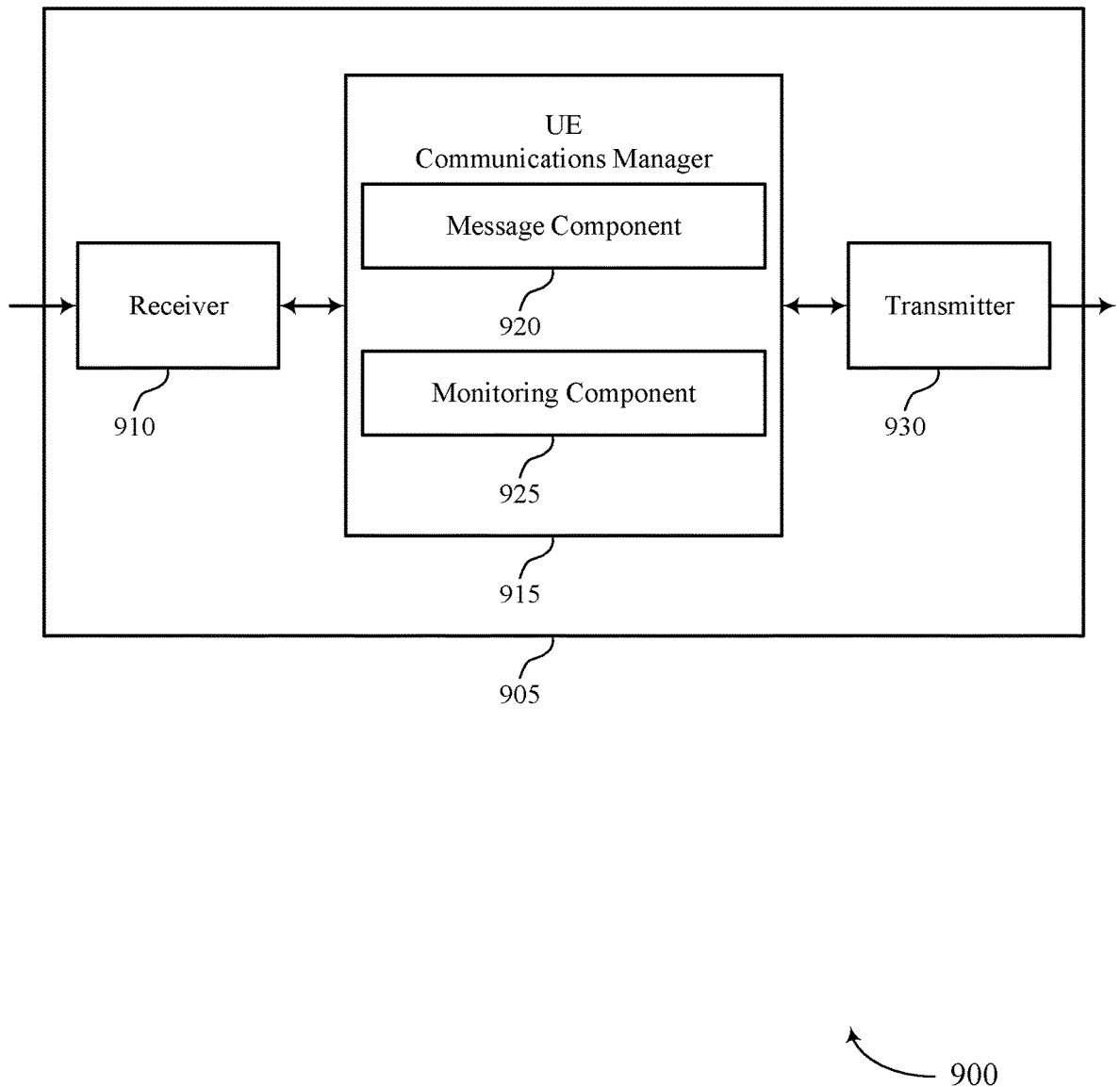

FIG. 9 shows a block diagram 900 of a device 905 in accordance with aspects of the present disclosure. The device 905 may be an example of aspects of a device 805, or a UE 115 as described herein. The device 905 may include a receiver 910, a UE communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to discontinuous downlink channel monitoring). Information may be passed on to other components of the device 905. The receiver 910 may be an example of aspects of the transceiver 1120 described with reference to FIG. 11. The receiver 910 may utilize a single antenna or a set of antennas.

The UE communications manager 915 may be an example of aspects of the UE communications manager 815 as described herein. The UE communications manager 915 may include a message component 920 and a monitoring component 925. The UE communications manager 915 may be an example of aspects of the UE communications manager 1110 described herein. The message component 920 may receive a DCI message including an indication to enable discontinuous monitoring of a PDCCH. The monitoring component 925 may enable the discontinuous monitoring of the PDCCH based on the received DCI message and disable monitoring of the PDCCH during a temporal period in which at least one of PDSCH reception, downlink reference signal monitoring, uplink reference signal transmissions, and channel reporting is enabled.

The transmitter 930 may transmit signals generated by other components of the device 905. In some examples, the transmitter 930 may be collocated with a receiver 910 in a transceiver component. For example, the transmitter 930 may be an example of aspects of the transceiver 1120 described with reference to FIG. 11. The transmitter 930 may utilize a single antenna or a set of antennas.

Figure 10:
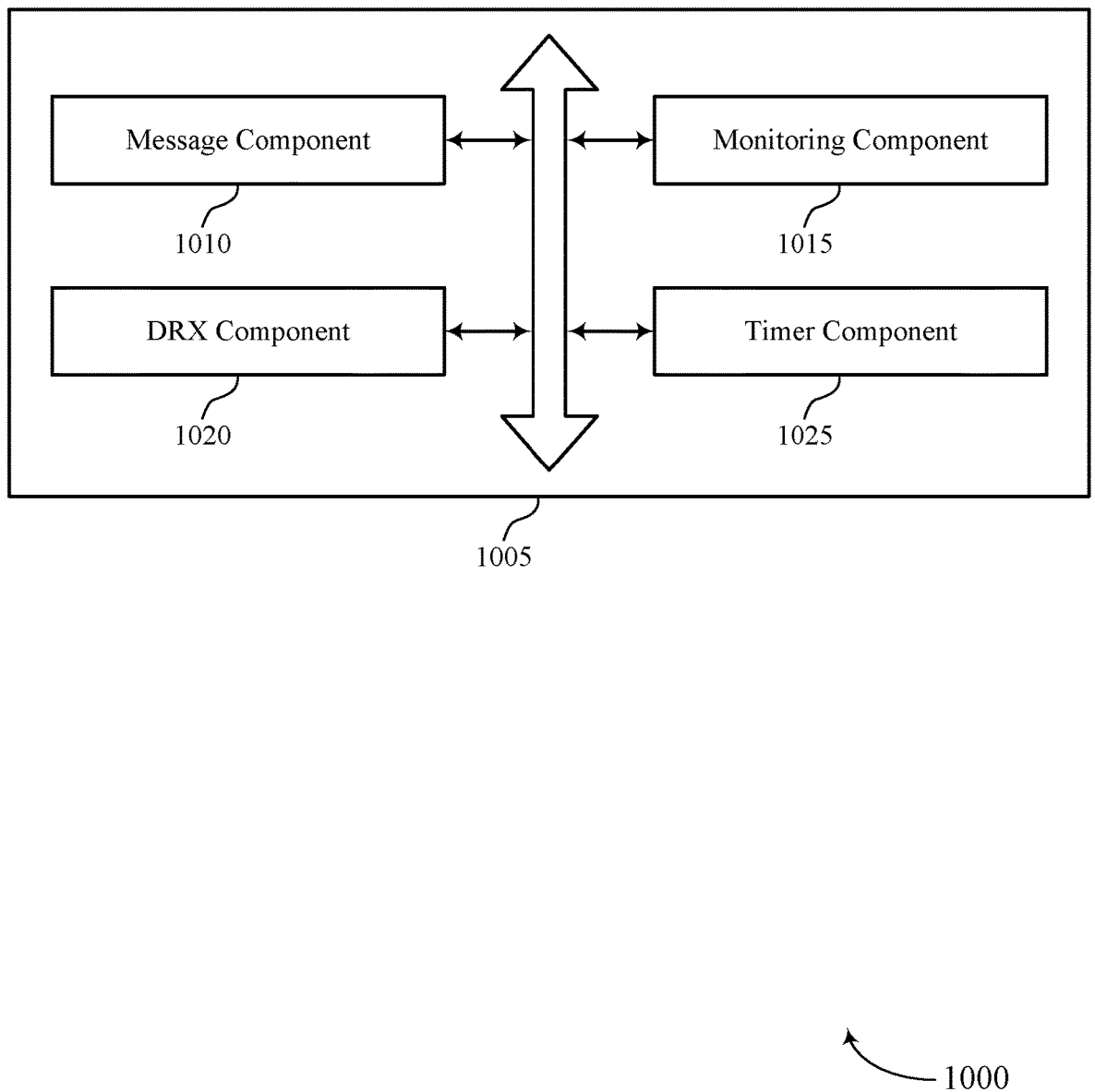
FIG. 10 shows a block diagram of a user equipment (UE) communications manager in accordance with aspects of the present disclosure.

FIG. 10 shows a block diagram 1000 of a UE communications manager 1005 in accordance with aspects of the present disclosure. The UE communications manager 1005 may be an example of aspects of a UE communications manager 815, a UE communications manager 915, or a UE communications manager 1110 described herein. The UE communications manager 1005 may include a message component 1010, a monitoring component 1015, a DRX component 1020, and a timer component 1025. Each of these components may communicate, directly or indirectly, with one another (e.g., via one or more buses).

The message component 1010 may receive a DCI message including an indication to enable discontinuous monitoring of a PDCCH. In some examples, the message component 1010 may identify a type associated with the DPMI. In some examples, the message component 1010 may determine whether to enable monitoring of the PDCCH during at least an active portion based on the identified type associated with a DPMI. In some examples, the message component 1010 may identify a DPMI field in the received DCI message for downlink data transmission or uplink data transmission, the DPMI field including an indication of whether discontinuous PDCCH monitoring is enabled by the received DCI message, where disabling monitoring of the PDCCH is based on the DPMI field in the received DCI message. In some examples, the message component 1010 may transmit an uplink transmission during the active portion while disabling monitoring of the PDCCH.

The indication may include a DPMI, where enabling the discontinuous monitoring of the PDCCH during the discontinuous reception cycle is based on the DPMI. In some cases, the DPMI field corresponds to one or more discontinuous PDCCH monitoring parameters. In some cases, the one or more discontinuous PDCCH monitoring parameters indicate to refrain from disabling the monitoring of the PDCCH during at least the active portion. In some cases, the one or more discontinuous PDCCH monitoring parameters indicate the temporal period for disabling the monitoring of the PDCCH during at least the active portion based at least in part on that C-DRX is enabled (e.g., if a connected mode DRX is enabled). In some cases, the one or more discontinuous PDCCH monitoring parameters indicate disabling the monitoring of the PDCCH until a subsequent active portion associated with a subsequent discontinuous reception cycle. In some cases, the one or more discontinuous PDCCH monitoring parameters indicate disabling the monitoring of the PDCCH based on determining whether a retransmission timer is enabled or disabled. In some cases, the uplink transmission includes a HARQ feedback, a channel state information report, or a sounding reference signal transmission.

The monitoring component 1015 may enable the discontinuous monitoring of the PDCCH based on the received DCI message. In some examples, the monitoring component 1015 may disable monitoring of the PDCCH during a temporal period in which at least one of PDSCH reception, downlink reference signal monitoring, uplink reference signal transmissions, and channel reporting is enabled. In some examples, the monitoring component 1015 may disable the monitoring of the PDCCH until a subsequent active portion associated with a subsequent discontinuous reception cycle based on the identified type associated with the DPMI. In some examples, the monitoring component 1015 may determine the temporal period for disabling the monitoring of the PDCCH based on the identified type associated with the DPMI. In some cases, the temporal period for disabling the monitoring of the PDCCH occurs within the active portion of the discontinuous reception cycle based at least in part on that C-DRX is enabled.

The DRX component 1020 may determine that a connected mode discontinuous reception mode is disabled for the UE, where receiving the DCI message including the indication is based on the connected mode discontinuous reception mode being disabled. In some examples, the DRX component 1020 may determine that a connected mode discontinuous reception mode is enabled for the UE. In some examples, the DRX component 1020 may terminate monitoring of the PDCCH before expiration of the inactivity timer. In some cases, determining a discontinuous reception cycle including an active portion and an inactive portion, where enabling the discontinuous monitoring of the PDCCH includes: enabling the discontinuous monitoring of the PDCCH during the discontinuous reception cycle, and disabling monitoring of the PDCCH includes: disabling monitoring of the PDCCH during at least the active portion of the discontinuous reception cycle.

The timer component 1025 may determine that a retransmission timer associated with the discontinuous reception cycle is disabled, where disabling the monitoring of the PDCCH is based on determining that the retransmission timer is disabled. In some examples, the timer component 1025 may determine that a retransmission timer associated with the discontinuous reception cycle is enabled. In some examples, the timer component 1025 may enable monitoring of the PDCCH during at least the active portion based on determining the retransmission timer is enabled. In some examples, the timer component 1025 may enable an inactivity timer based on receiving a PDCCH during the active portion. In some cases, the inactivity timer is separate from the temporal period associated with the discontinuous monitoring of the PDCCH.

Figure 11:
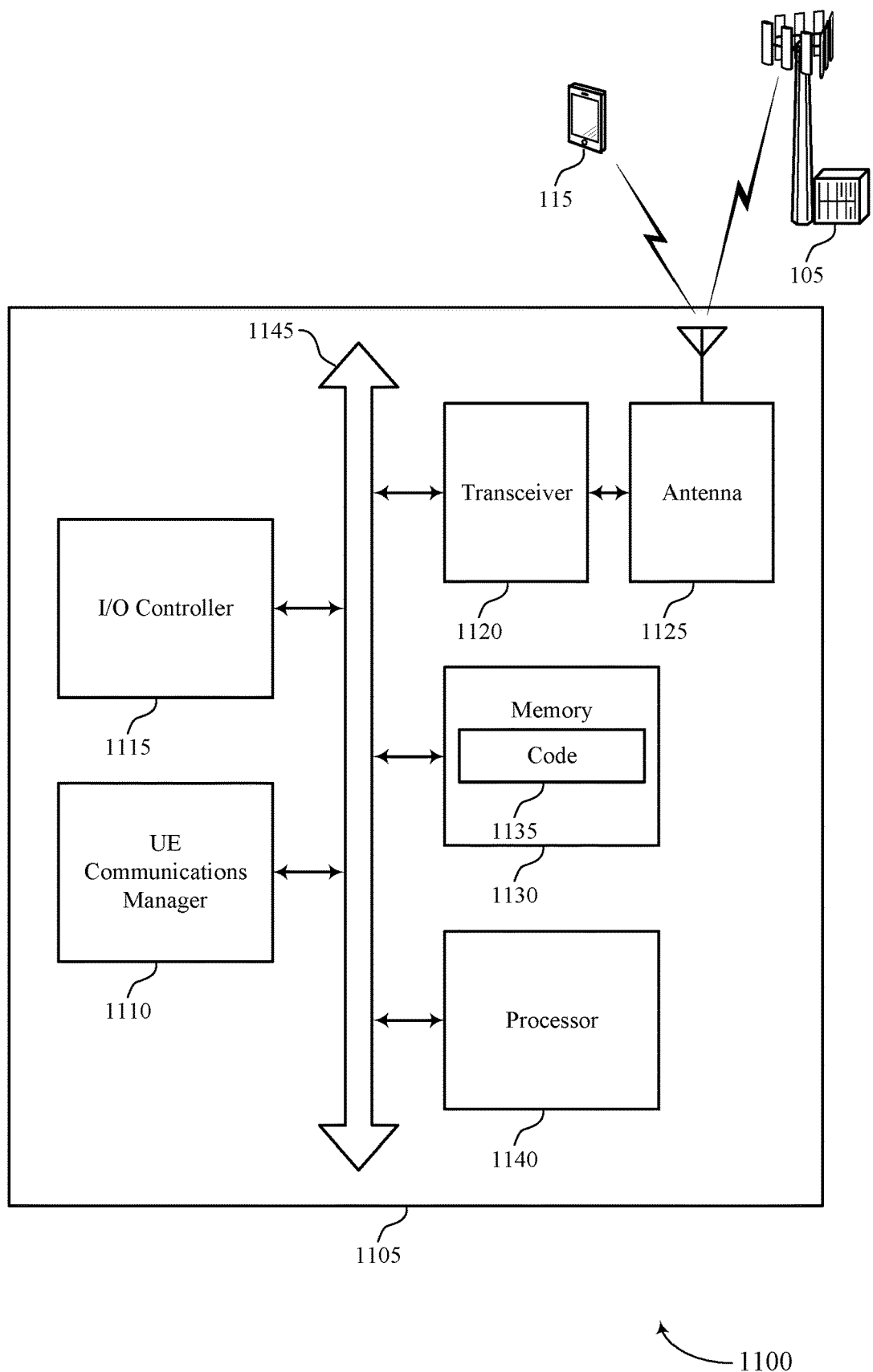
FIG. 11 shows a diagram of a system including a device in accordance with aspects of the present disclosure.

FIG. 11 shows a diagram of a system 1100 including a device 1105 in accordance with aspects of the present disclosure. The device 1105 may be an example of or include the components of device 805, device 905, or a UE 115 as described herein. The device 1105 may include components for bi-directional voice and data communications including components for transmitting and receiving communications, including a UE communications manager 1110, an I/O controller 1115, a transceiver 1120, an antenna 1125, memory 1130, and a processor 1140. These components may be in electronic communication via one or more buses (e.g., bus 1145).

The UE communications manager 1110 may receive a DCI message including an indication to enable discontinuous monitoring of a PDCCH, enable the discontinuous monitoring of the PDCCH based on the received DCI message, and disable monitoring of the PDCCH during a temporal period in which at least one of PDSCH reception, downlink reference signal monitoring, uplink reference signal transmissions, and channel reporting is enabled.

The device 1105 as described herein may be implemented to realize one or more potential advantages. Various implementations may enable power saving for the device 1105. At least one implementation may enable the processor 1140 of the device 1105 (e.g., processor(s) controlling or incorporated with the UE communications manager 1110) to disable monitoring of a PDCCH during a temporal period while performing other wireless operations CSI-RS monitoring, CSI reporting, SRS transmissions. At least one implementation may enable the processor 1140 of the device 1105 to disable monitoring of a PDCCH during an active portion of a DRX cycle while performing other wireless operations CSI-RS monitoring, CSI reporting, SRS transmission during the active portion of the DRX cycle.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the device 1105 may include a single antenna 1125. However, in some cases, the device 1105 may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor 1140 to perform various functions described herein. In some cases, the memory 1130 may contain, among other things, a BIOS which may control basic hardware or software operation such as the interaction with peripheral components or devices.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting discontinuous downlink channel monitoring).

Figure 12:
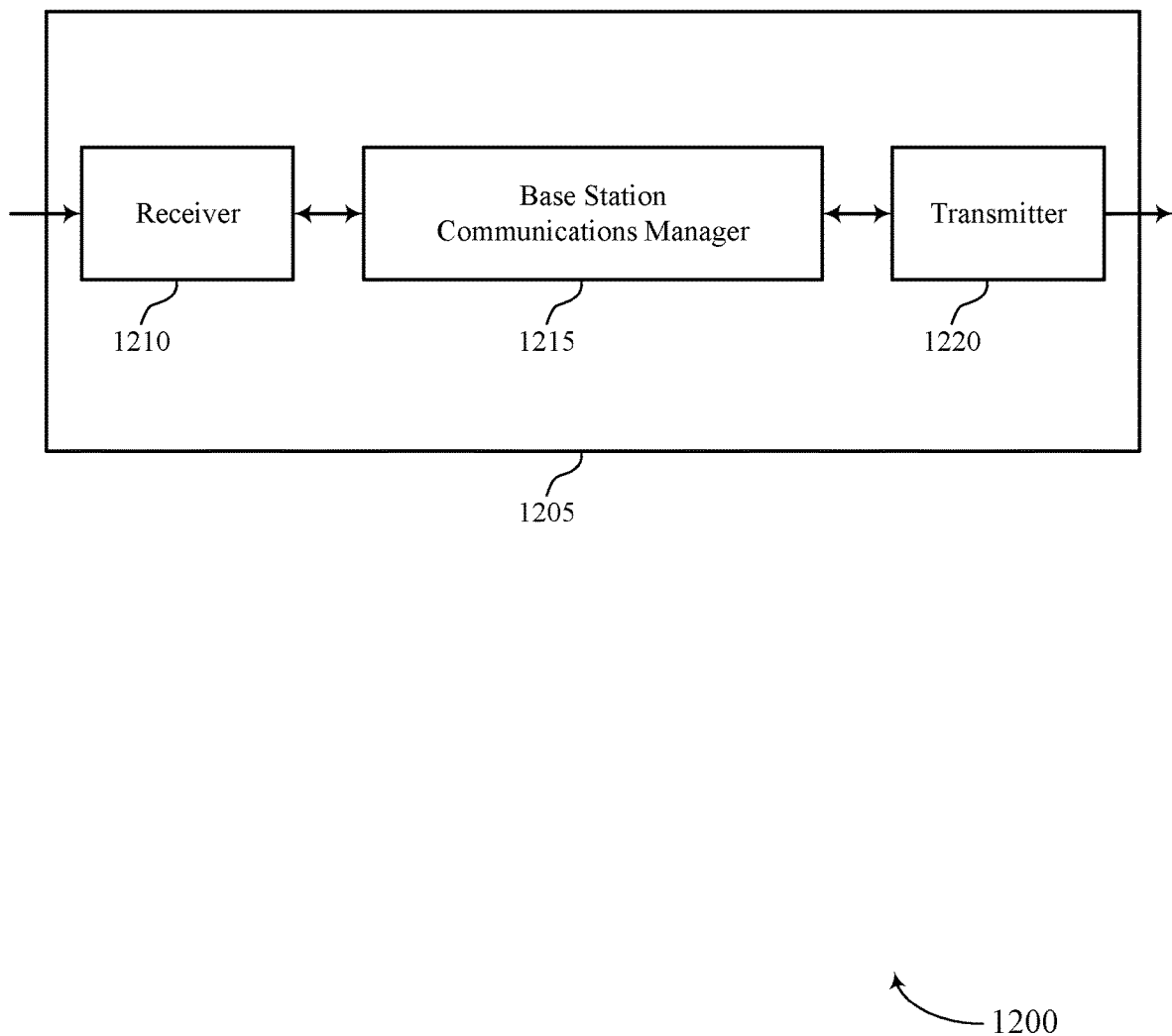
FIGS. 12 and 13 show block diagrams of in accordance with aspects of the present disclosure.

FIG. 12 shows a block diagram 1200 of a device 1205 in accordance with aspects of the present disclosure. The device 1205 may be an example of aspects of a base station 105 as described herein. The device 1205 may include a receiver 1210, a base station communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to discontinuous downlink channel monitoring). Information may be passed on to other components of the device 1205. The receiver 1210 may be an example of aspects of the transceiver 1520 described with reference to FIG. 15. The receiver 1210 may utilize a single antenna or a set of antennas.

The base station communications manager 1215 may determine whether to enable or disable discontinuous monitoring of a PDCCH for a UE and transmit a DCI message including an indication of whether discontinuous PDCCH monitoring is enabled or disabled for the UE during a temporal period in which at least one of PDSCH reception, downlink reference signal monitoring, uplink reference signal transmissions, and channel reporting is enabled. The base station communications manager 1215 may be an example of aspects of the base station communications manager 1510 described herein.

The base station communications manager 1215, or its sub-components, may be implemented in hardware, code (e.g., software or firmware) executed by a processor, or any combination thereof. If implemented in code executed by a processor, the functions of the base station communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1215, or its sub-components, may be physically located at various positions, including being distributed such that portions of functions are implemented at different physical locations by one or more physical components. In some examples, the base station communications manager 1215, or its sub-components, may be a separate and distinct component in accordance with various aspects of the present disclosure. In some examples, the base station communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver component. For example, the transmitter 1220 may be an example of aspects of the transceiver 1520 described with reference to FIG. 15. The transmitter 1220 may utilize a single antenna or a set of antennas.

Figure 13:
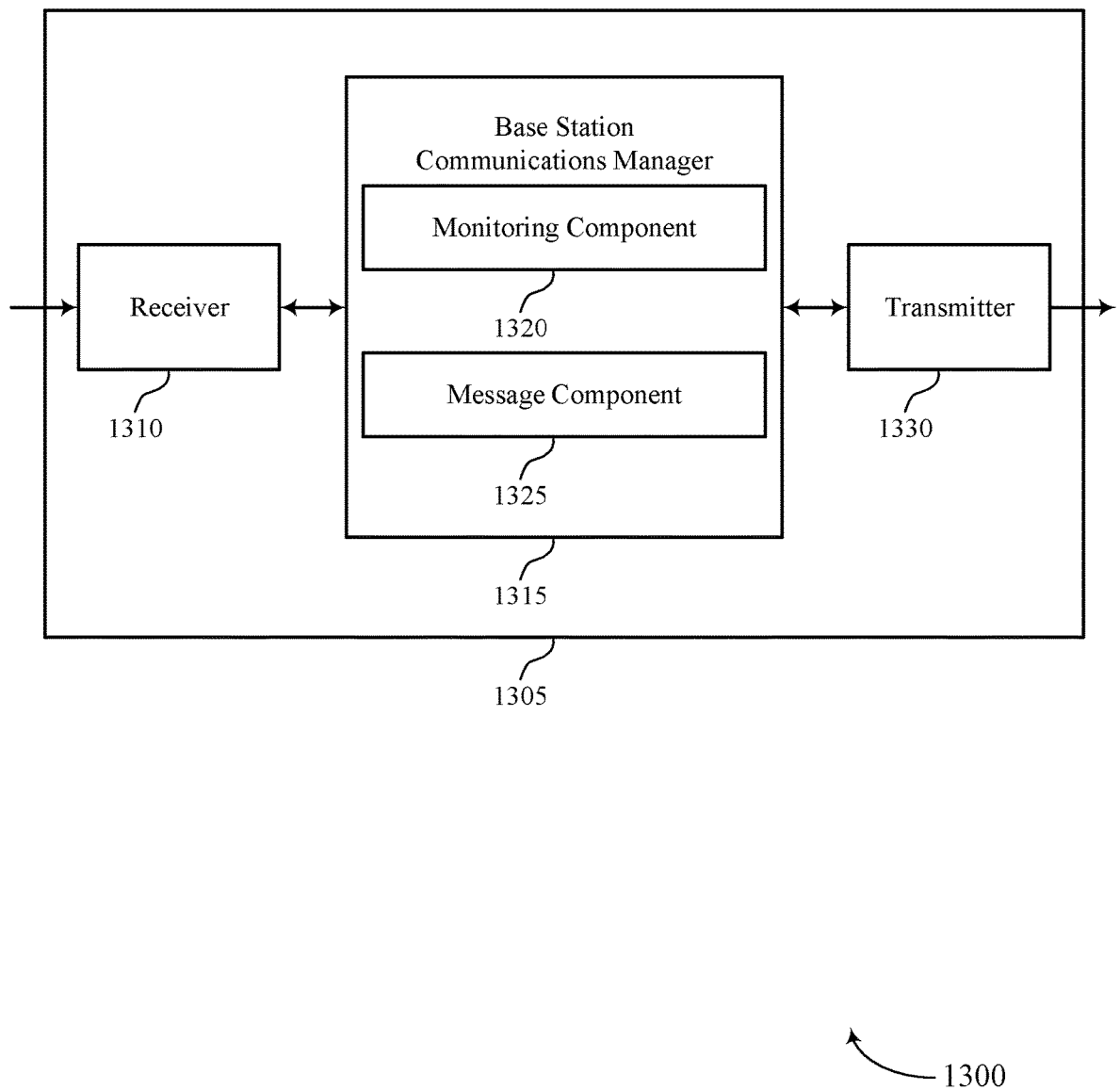

FIG. 13 shows a block diagram 1300 of a device 1305 in accordance with aspects of the present disclosure. The device 1305 may be an example of aspects of a device 1205, or a base station 105 as described herein. The device 1305 may include a receiver 1310, a base station communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to discontinuous downlink channel monitoring). Information may be passed on to other components of the device 1305. The receiver 1310 may be an example of aspects of the transceiver 1520 described with reference to FIG. 15. The receiver 1310 may utilize a single antenna or a set of antennas.

The base station communications manager 1315 may be an example of aspects of the base station communications manager 1215 as described herein. The base station communications manager 1315 may include a monitoring component 1320 and a message component 1325. The base station communications manager 1315 may be an example of aspects of the base station communications manager 1510 described herein. The monitoring component 1320 may determine whether to enable or disable discontinuous monitoring of a PDCCH for a UE. The message component 1325 may transmit a DCI message including an indication of whether discontinuous PDCCH monitoring is enabled or disabled for the UE during a temporal period in which at least one of PDSCH reception, downlink reference signal monitoring, uplink reference signal transmissions, and channel reporting is enabled.

The transmitter 1330 may transmit signals generated by other components of the device 1305. In some examples, the transmitter 1330 may be collocated with a receiver 1310 in a transceiver component. For example, the transmitter 1330 may be an example of aspects of the transceiver 1520 described with reference to FIG. 15. The transmitter 1330 may utilize a single antenna or a set of antennas.

Figure 14:
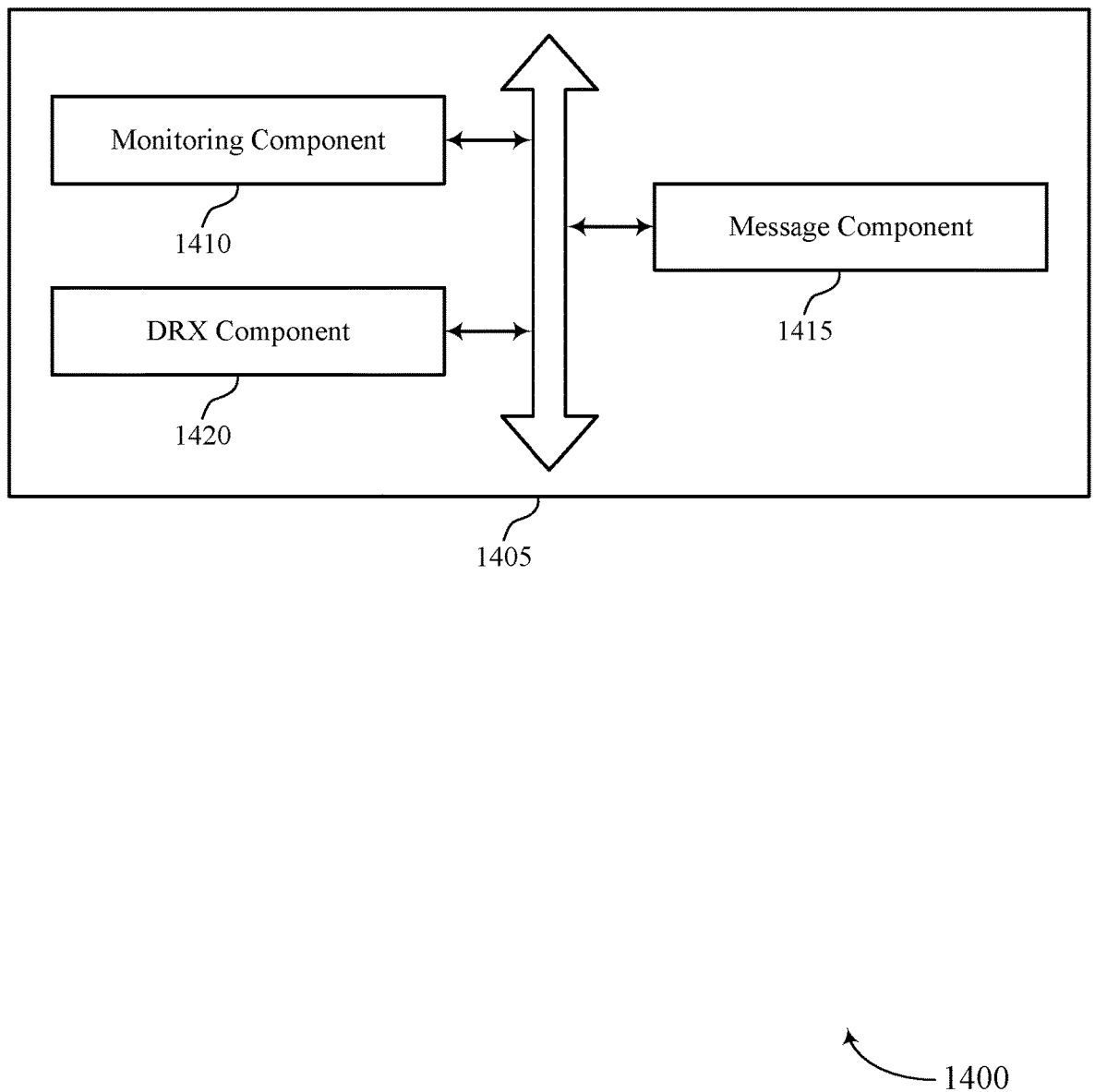
FIG. 14 shows a block diagram of a base station communications manager in accordance with aspects of the present disclosure.

FIG. 14 shows a block diagram 1400 of a base station communications manager 1405 in accordance with aspects of the present disclosure. The base station communications manager 1405 may be an example of aspects of a base station communications manager 1215, a base station communications manager 1315, or a base station communications manager 1510 described herein. The base station communications manager 1405 may include a monitoring component 1410, a message component 1415, and a DRX component 1420. Each of these components may communicate, directly or indirectly, with one another (e.g., via one or more buses).

The monitoring component 1410 may determine whether to enable or disable discontinuous monitoring of a PDCCH for a UE. The message component 1415 may transmit a DCI message including an indication of whether discontinuous PDCCH monitoring is enabled or disabled for the UE during a temporal period in which at least one of PDSCH reception, downlink reference signal monitoring, uplink reference signal transmissions, and channel reporting is enabled. In some examples, the message component 1415 may assign a type associated with the DPMI, where the type corresponds to whether the UE is to enable monitoring of the PDCCH during at least the active portion. In some examples, the message component 1415 may assign a DPMI field in the DCI message for downlink data transmission or uplink data transmission, or both, the DPMI field including an indication of whether discontinuous PDCCH monitoring is enabled.

In some cases, the indication includes a DPMI. In some cases, the DPMI field corresponds to one or more discontinuous PDCCH monitoring parameters. In some cases, the one or more discontinuous PDCCH monitoring parameters indicate to the UE to refrain from disabling the monitoring of the PDCCH during at least the active portion. In some cases, the one or more discontinuous PDCCH monitoring parameters indicate the temporal period for the UE to disable the monitoring of the PDCCH during at least the active portion. In some cases, the one or more discontinuous PDCCH monitoring parameters indicate for the UE to disable the monitoring of the PDCCH until a subsequent active portion associated with a subsequent discontinuous reception cycle. In some cases, the one or more discontinuous PDCCH monitoring parameters indicate to the UE to disable the monitoring of the PDCCH based on an enabled or a disabled retransmission timer. The DRX component 1420 may determine that a connected mode discontinuous reception mode is disabled for the UE, where transmitting the DCI message is based on the connected mode discontinuous reception mode being disabled. In some examples, the DRX component 1420 may determine a discontinuous reception cycle including an active portion and an inactive portion.

Figure 15:
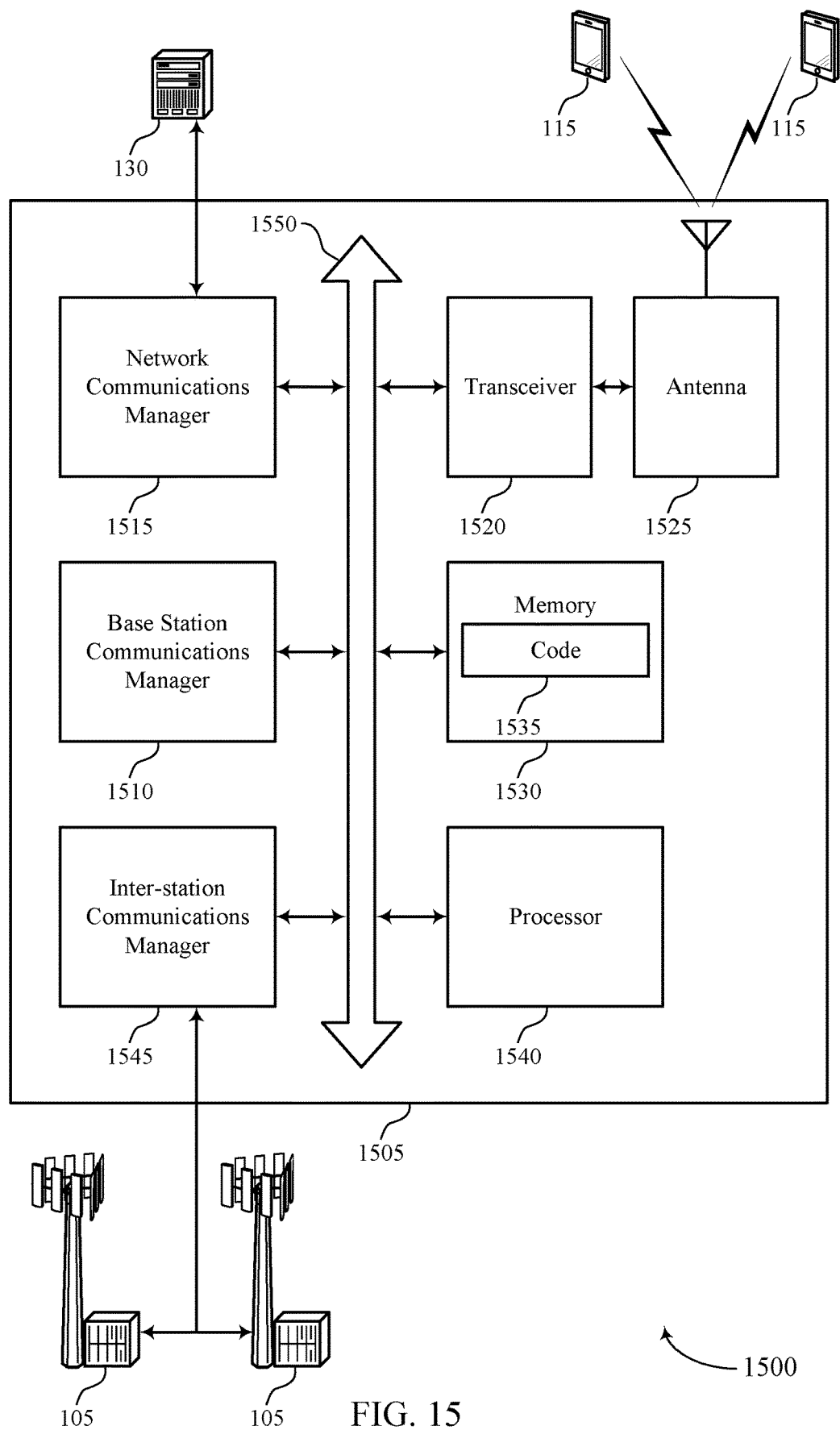
FIG. 15 shows a diagram of a system including a device in accordance with aspects of the present disclosure.

FIG. 15 shows a diagram of a system 1500 including a device 1505 in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a base station communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The base station communications manager 1510 may determine whether to enable or disable discontinuous monitoring of a PDCCH for a UE and transmit a DCI message including an indication of whether discontinuous PDCCH monitoring is enabled or disabled for the UE during a temporal period in which at least one of PDSCH reception, downlink reference signal monitoring, uplink reference signal transmissions, and channel reporting is enabled.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas. In some cases, the device 1505 may include a single antenna 1525. However, in some cases, the device 1505 may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting discontinuous downlink channel monitoring).

The inter-station communications manager 1545 may manage communications with other base station 105 and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

Figure 16:
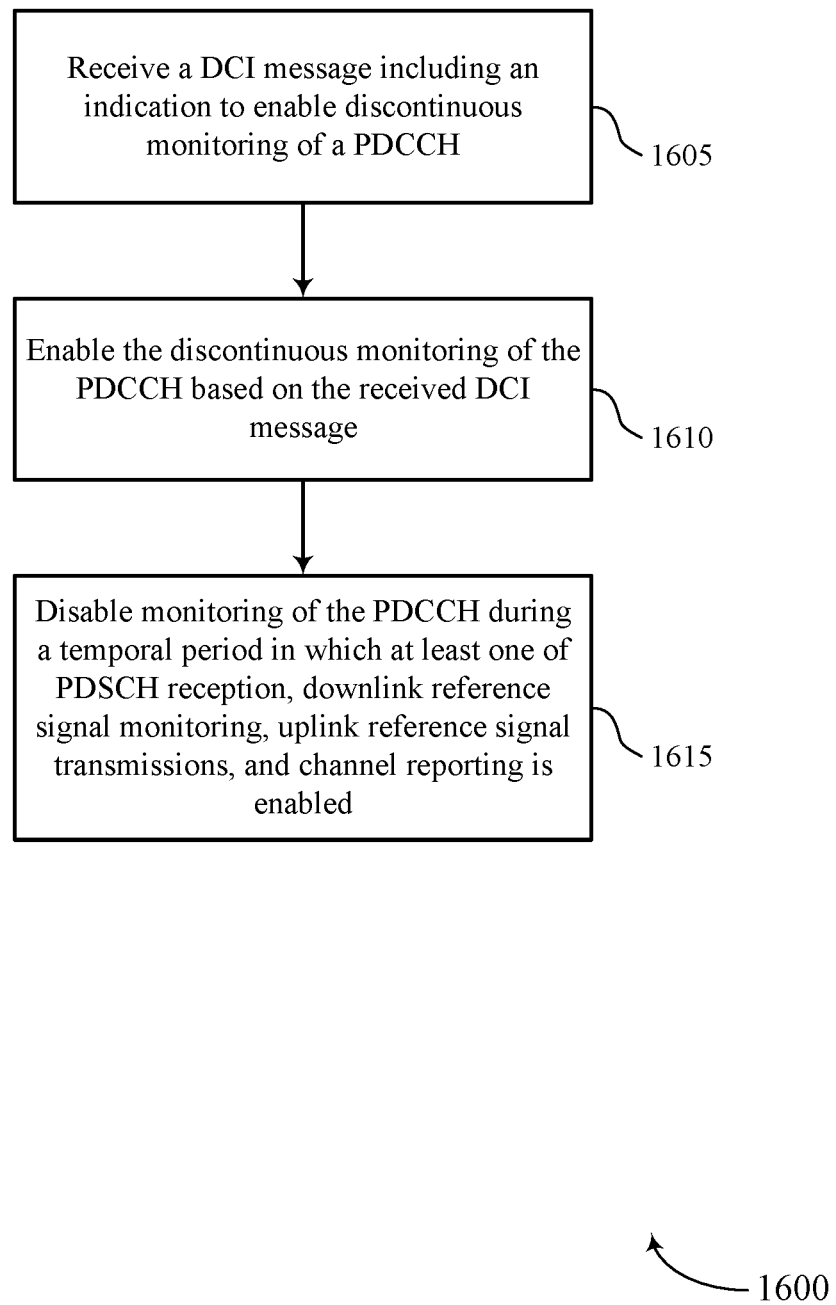
FIGS. 16 through 18 show flowcharts illustrating methods in accordance with aspects of the present disclosure.

FIG. 16 shows a flowchart illustrating a method 1600 in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive a DCI message including an indication to enable discontinuous monitoring of a PDCCH. The operations of 1605 may be performed according to the methods described herein. In some examples, aspects of the operations of 1605 may be performed by a message component as described with reference to FIGS. 8 through 11.

At 1610, the UE may enable the discontinuous monitoring of the PDCCH based on the received DCI message. The operations of 1610 may be performed according to the methods described herein. In some examples, aspects of the operations of 1610 may be performed by a monitoring component as described with reference to FIGS. 8 through 11.

At 1615, the UE may disable monitoring of the PDCCH during a temporal period in which at least one of PDSCH reception, downlink reference signal monitoring, uplink reference signal transmissions, and channel reporting is enabled. The operations of 1615 may be performed according to the methods described herein. In some examples, aspects of the operations of 1615 may be performed by a monitoring component as described with reference to FIGS. 8 through 11.

Figure 17:
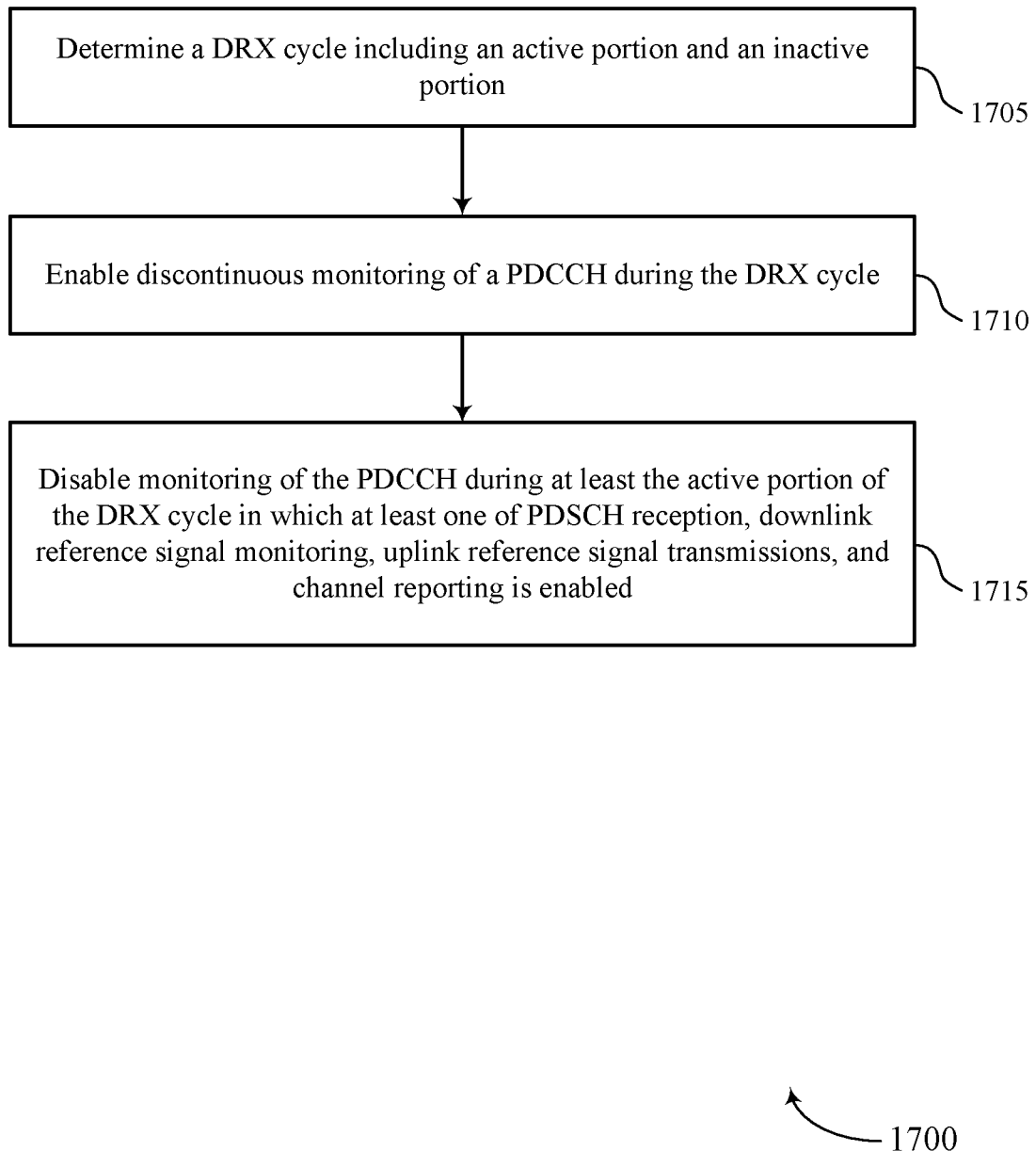

FIG. 17 shows a flowchart illustrating a method 1700 in accordance with aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may determine a DRX cycle including an active portion and an inactive portion. The operations of 1705 may be performed according to the methods described herein. In some examples, aspects of the operations of 1705 may be performed by a DRX component as described with reference to FIGS. 8 through 11.

At 1710, the UE may enable discontinuous monitoring of a PDCCH during the DRX cycle. The operations of 1710 may be performed according to the methods described herein. In some examples, aspects of the operations of 1710 may be performed by a monitoring component as described with reference to FIGS. 8 through 11.

At 1715, the UE may disable monitoring of the PDCCH during at least the active portion of the DRX cycle in which at least one of PDSCH reception, downlink reference signal monitoring, uplink reference signal transmissions, and channel reporting is enabled. The operations of 1715 may be performed according to the methods described herein. In some examples, aspects of the operations of 1715 may be performed by a monitoring component as described with reference to FIGS. 8 through 11.

Figure 18:
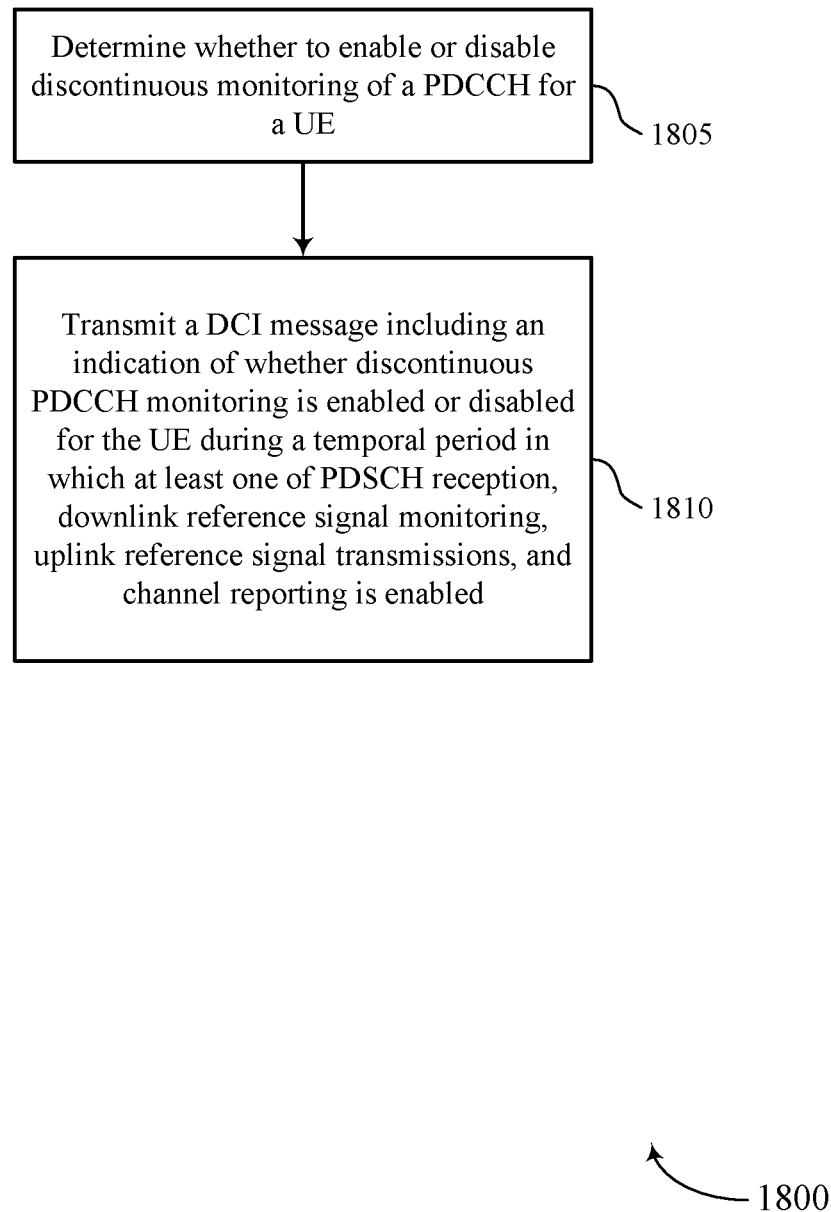

FIG. 18 shows a flowchart illustrating a method 1800 that supports discontinuous downlink channel monitoring in accordance with aspects of the present disclosure. The operations of method 1800 may be implemented by a base station 105 or its components as described herein. For example, the operations of method 1800 may be performed by a base station communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1805, the base station may determine whether to enable or disable discontinuous monitoring of a PDCCH for a UE. The operations of 1805 may be performed according to the methods described herein. In some examples, aspects of the operations of 1805 may be performed by a monitoring component as described with reference to FIGS. 12 through 15.

At 1810, the base station may transmit a DCI message including an indication of whether discontinuous PDCCH monitoring is enabled or disabled for the UE during a temporal period in which at least one of PDSCH reception, downlink reference signal monitoring, uplink reference signal transmissions, and channel reporting is enabled. The operations of 1810 may be performed according to the methods described herein. In some examples, aspects of the operations of 1810 may be performed by a message component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving a DCI message comprising an indication to enable discontinuous monitoring of a PDCCH; enabling the discontinuous monitoring of the PDCCH based at least in part on the received DCI message; and disabling monitoring of the PDCCH during a temporal period in which at least one of PDSCH, downlink reference signal monitoring, uplink reference signal transmissions, and channel reporting is enabled.

Aspect 2: The method of aspect 1, further comprising: determining a DRX cycle comprising an active portion and an inactive portion, wherein enabling the discontinuous monitoring of the PDCCH comprises: enabling the discontinuous monitoring of the PDCCH during the DRX cycle, and disabling monitoring of the PDCCH comprises: disabling monitoring of the PDCCH during at least the active portion of the DRX cycle.

Aspect 3: The method of aspect 2, wherein the indication comprises a DPMI, enabling the discontinuous monitoring of the PDCCH during the DRX cycle is based at least in part on the DPMI.

Aspect 4: The method of aspect 3, further comprising: determining that a C-DRX mode is disabled for the UE, wherein receiving the DCI message comprising the indication is based at least in part on the C-DRX mode being disabled.

Aspect 5: The method of any of aspects 3 through 4, further comprising: identifying a type associated with the DPMI; and determining whether to enable monitoring of the PDCCH during at least the active portion based at least in part on the identified type associated with the DPMI.

Aspect 6: The method of aspect 5, further comprising: disabling the monitoring of the PDCCH until a subsequent active portion associated with a subsequent DRX cycle based at least in part on the identified type associated with the DPMI.

Aspect 7: The method of aspect 6, further comprising: determining the temporal period for disabling the monitoring of the PDCCH based at least in part on the identified type associated with the DPMI.

Aspect 8: The method of aspect 7, wherein the temporal period for disabling the monitoring of the PDCCH occurs within the active portion of the DRX cycle based at least in part on that C-DRX is enabled.

Aspect 9: The method of any of aspects 5 through 8, further comprising: determining that a retransmission timer associated with the DRX cycle is disabled, wherein disabling the monitoring of the PDCCH is based at least in part on determining that the retransmission timer is disabled.

Aspect 10: The method of any of aspects 5 through 9, further comprising: determining that a retransmission timer associated with the DRX cycle is enabled; and enabling monitoring of the PDCCH during at least the active portion based at least in part on determining the retransmission timer is enabled.

Aspect 11: The method of any of aspects 3 through 10, further comprising: identifying a DPMI field in the received DCI message for downlink data transmission or uplink data transmission, the DPMI field comprising an indication of whether discontinuous PDCCH monitoring is enabled by the received DCI message, wherein disabling monitoring of the PDCCH is based at least in part on the DPMI field in the received DCI message.

Aspect 12: The method of aspect 11, wherein the DPMI field corresponds to one or more discontinuous PDCCH monitoring parameters.

Aspect 13: The method of aspect 12, wherein the one or more discontinuous PDCCH monitoring parameters indicate to refrain from disabling the monitoring of the PDCCH during at least the active portion.

Aspect 14: The method of any of aspects 12 through 13, wherein the one or more discontinuous PDCCH monitoring parameters indicate the temporal period for disabling the monitoring of the PDCCH during at least the active portion.

Aspect 15: The method of any of aspects 12 through 14, wherein the one or more discontinuous PDCCH monitoring parameters indicate disabling the monitoring of the PDCCH until a subsequent active portion associated with a subsequent DRX cycle.

Aspect 16: The method of any of aspects 12 through 15, wherein the one or more discontinuous PDCCH monitoring parameters indicate disabling the monitoring of the PDCCH based at least in part on determining whether a retransmission timer is enabled or disabled.

Aspect 17: The method of any of aspects 2 through 16, further comprising: transmitting an uplink transmission during the active portion while disabling monitoring of the PDCCH, wherein the uplink transmission comprises a HARQ feedback, a CSI report, or an SRS transmission.

Aspect 18: The method of any of aspects 2 through 17, further comprising: enabling an inactivity timer based at least in part on receiving the PDCCH during the active portion, wherein the inactivity timer is separate from the temporal period associated with the discontinuous monitoring of the PDCCH.

Aspect 19: The method of aspect 18, further comprising: determining that a C-DRX mode is enabled for the UE; and terminating monitoring of the PDCCH before expiration of the inactivity timer.

Aspect 20: A method for wireless communication at a base station, comprising: determining whether to enable or disable discontinuous monitoring of a PDCCH for a UE; and transmitting a DCI message comprising an indication of whether discontinuous PDCCH monitoring is enabled or disabled for the UE during a temporal period in which at least one of PDSCH reception, downlink reference signal monitoring, uplink reference signal transmissions, and channel reporting is enabled.

Aspect 21: The method of aspect 20, further comprising: determining that a C-DRX mode is disabled for the UE, wherein transmitting the DCI message is based at least in part on the C-DRX mode being disabled.

Aspect 22: The method of any of aspects 20 through 21, further comprising: determining a DRX cycle comprising an active portion and an inactive portion, wherein the indication comprises a DPMI.

Aspect 23: The method of aspect 22, further comprising: assigning a type associated with the DPMI, wherein the type corresponds to whether the UE is to enable monitoring of the PDCCH during at least the active portion.

Aspect 24: The method of any of aspects 22 through 23, further comprising: assigning a DPMI field in the DCI message for downlink data transmission or uplink data transmission, or both, the DPMI field comprising an indication of whether discontinuous PDCCH monitoring is enabled wherein the DPMI field corresponds to one or more discontinuous PDCCH monitoring parameters.

Aspect 25: The method of aspect 24, wherein the one or more discontinuous PDCCH monitoring parameters indicate to the UE to refrain from disabling the monitoring of the PDCCH during at least the active portion.

Aspect 26: The method of any of aspects 24 through 25, wherein the one or more discontinuous PDCCH monitoring parameters indicate the temporal period for the UE to disable the monitoring of the PDCCH during at least the active portion based at least in part on that a C-DRX mode is enabled.

Aspect 27: The method of any of aspects 24 through 26, wherein the one or more discontinuous PDCCH monitoring parameters indicate for the UE to disable the monitoring of the PDCCH until a subsequent active portion associated with a subsequent DRX cycle.

Aspect 28: The method of any of aspects 24 through 27, wherein the one or more discontinuous PDCCH monitoring parameters indicate to the UE to disable the monitoring of the PDCCH based at least in part on an enabled or a disabled retransmission timer.

Aspect 29: An apparatus for wireless communication at a UE, comprising a processor; memory coupled with the processor; and instructions stored in the memory and executable by the processor to cause the apparatus to perform a method of any of aspects 1 through 19.

Aspect 30: An apparatus for wireless communication at a UE, comprising at least one means for performing a method of any of aspects 1 through 19.

Aspect 31: A non-transitory computer-readable medium storing code for wireless communication at a UE, the code comprising instructions executable by a processor to perform a method of any of aspects 1 through 19.

Aspect 32: An apparatus for wireless communication at a base station, comprising a processor; memory coupled with the processor; and instructions stored in the memory and executable by the processor to cause the apparatus to perform a method of any of aspects 20 through 28.

Aspect 33: An apparatus for wireless communication at a base station, comprising at least one means for performing a method of any of aspects 20 through 28.

Aspect 34: A non-transitory computer-readable medium storing code for wireless communication at a base station, the code comprising instructions executable by a processor to perform a method of any of aspects 20 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the phrase "a set" shall be construed as including the possibility of a set with one member. That is, the phrase "a set" shall be construed in the same manner as "one or more."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
   at least one processor; and
   at least one memory coupled with the at least one processor, with instructions stored in the at least one memory, the instructions being executable by the at least one processor, individually or in any combination, to cause the apparatus to:
     receive downlink control information including an indication to enable discontinuous monitoring of a physical downlink control channel;
     enable the discontinuous monitoring of the physical downlink control channel based at least in part on the received downlink control information; and
     disable, based at least in part on the received downlink control information, monitoring of the physical downlink control channel associated with a common search space set configured for a plurality of apparatuses, including the apparatus, during a temporal period in which at least one of physical downlink shared channel, downlink reference signal monitoring, uplink reference signal transmissions, and channel state information reporting is enabled.

2. The apparatus of claim 1, wherein the instructions are further executable by the at least one processor to cause the apparatus to:
   determine a discontinuous reception cycle comprising an active portion and an inactive portion, wherein the instructions to enable the discontinuous monitoring of the physical downlink control channel are executable by the at least one processor to cause the apparatus to:
enable the discontinuous monitoring of the physical downlink control channel during the discontinuous reception cycle, and wherein the instructions to disable monitoring of the physical downlink control channel are executable by the at least one processor to cause the apparatus to:
disable monitoring of the physical downlink control channel during at least the active portion of the discontinuous reception cycle.

3. The apparatus of claim 2, wherein the indication comprises a discontinuous physical downlink control channel monitoring indication, wherein the instructions to enable the discontinuous monitoring of the physical downlink control channel during the discontinuous reception cycle are executable by the at least one processor based at least in part on the discontinuous physical downlink control channel monitoring indication.

4. The apparatus of claim 1, wherein the instructions are further executable by the at least one processor to cause the apparatus to:
determine that a connected mode discontinuous reception mode is disabled for the apparatus, wherein the instructions to receive the downlink control information comprising the indication are executable by the at least one processor based at least in part on the connected mode discontinuous reception mode being disabled.

5. The apparatus of claim 3, wherein the instructions are further executable by the at least one processor to cause the apparatus to:
identify a type associated with the discontinuous physical downlink control channel monitoring indication; and
determine whether to enable monitoring of the physical downlink control channel during at least the active portion based at least in part on the identified type associated with the discontinuous physical downlink control channel monitoring indication.

6. The apparatus of claim 5, wherein the instructions are further executable by the at least one processor to cause the apparatus to:
disable the monitoring of the physical downlink control channel until a subsequent active portion associated with a subsequent discontinuous reception cycle based at least in part on the identified type associated with the discontinuous physical downlink control channel monitoring indication.

7. The apparatus of claim 6, wherein the instructions are further executable by the at least one processor to cause the apparatus to:
determine the temporal period for disabling the monitoring of the physical downlink control channel based at least in part on the identified type associated with the discontinuous physical downlink control channel monitoring indication.

8. The apparatus of claim 7, wherein the temporal period for disabling the monitoring of the physical downlink control channel occurs within the active portion of the discontinuous reception cycle based at least in part on that connected mode discontinuous reception is enabled.

9. The apparatus of claim 5, wherein the instructions are further executable by the at least one processor to cause the apparatus to:
determine that a retransmission timer associated with the discontinuous reception cycle is disabled, wherein the instructions to disable the monitoring of the physical downlink control channel are executable by the at least one processor based at least in part on determining that the retransmission timer is disabled.

10. The apparatus of claim 5, wherein the instructions are further executable by the at least one processor to cause the apparatus to:
determine that a retransmission timer associated with the discontinuous reception cycle is enabled; and
enable monitoring of the physical downlink control channel during at least the active portion based at least in part on determining the retransmission timer is enabled.

11. The apparatus of claim 1, wherein the downlink control information comprises one or more downlink control information fields, and wherein the one or more downlink control information fields correspond to one or more discontinuous physical downlink control channel monitoring parameters.

12. The apparatus of claim 11, wherein the one or more discontinuous physical downlink control channel monitoring parameters indicate to refrain from disabling the monitoring of the physical downlink control channel during at least an active portion.

13. The apparatus of claim 11, wherein the one or more discontinuous physical downlink control channel monitoring parameters indicate the temporal period for disabling the monitoring of the physical downlink control channel during at least an active portion.

14. The apparatus of claim 11, wherein the one or more discontinuous physical downlink control channel monitoring parameters indicate disabling the monitoring of the physical downlink control channel until a subsequent active portion associated with a subsequent discontinuous reception cycle.

15. The apparatus of claim 11, wherein the one or more discontinuous physical downlink control channel monitoring parameters indicate disabling the monitoring of the physical downlink control channel based at least in part on determining whether a retransmission timer is enabled or disabled.

16. The apparatus of claim 2, wherein the instructions are further executable by the at least one processor to cause the apparatus to:
transmit an uplink transmission during the active portion while disabling monitoring of the physical downlink control channel, wherein the uplink transmission comprises a hybrid automatic repeat request feedback, a channel state information report, or a sounding reference signal transmission.

17. The apparatus of claim 2, wherein the instructions are further executable by the at least one processor to cause the apparatus to:
enable an inactivity timer based at least in part on receiving the physical downlink control channel during the active portion, wherein the inactivity timer is separate from the temporal period associated with the discontinuous monitoring of the physical downlink control channel.

18. The apparatus of claim 17, wherein the instructions are further executable by the at least one processor to cause the apparatus to:
determine that a connected mode discontinuous reception mode is enabled for the apparatus; and
terminate monitoring of the physical downlink control channel before expiration of the inactivity timer.

19. A method for wireless communication at a user equipment (UE), comprising:

receiving downlink control information including an indication to enable discontinuous monitoring of a physical downlink control channel;

enabling the discontinuous monitoring of the physical downlink control channel based at least in part on the received downlink control information; and disabling, based at least in part on the received downlink control information, monitoring of the physical downlink control channel associated with a common search space set configured for a plurality of UEs, including the UE, during a temporal period in which at least one of physical downlink shared channel, downlink reference signal monitoring, uplink reference signal transmissions, and channel state information reporting is enabled.

20. The method of claim 19, further comprising:

determining a discontinuous reception cycle comprising an active portion and an inactive portion, wherein enabling the discontinuous monitoring of the physical downlink control channel further comprises:

enabling the discontinuous monitoring of the physical downlink control channel during the discontinuous reception cycle, and wherein disabling monitoring of the physical downlink control channel further comprises:

disabling monitoring of the physical downlink control channel during at least the active portion of the discontinuous reception cycle.

21. The method of claim 20, wherein the indication comprises a discontinuous physical downlink control channel monitoring indication, wherein enabling the discontinuous monitoring of the physical downlink control channel during the discontinuous reception cycle is based at least in part on the discontinuous physical downlink control channel monitoring indication.

22. The method of claim 21, further comprising:

identifying a type associated with the discontinuous physical downlink control channel monitoring indication; and determining whether to enable monitoring of the physical downlink control channel during at least the active portion based at least in part on the identified type associated with the discontinuous physical downlink control channel monitoring indication.

23. The method of claim 22, further comprising:

disabling the monitoring of the physical downlink control channel until a subsequent active portion associated with a subsequent discontinuous reception cycle based at least in part on the identified type associated with the discontinuous physical downlink control channel monitoring indication.

24. The method of claim 23, further comprising:

determining the temporal period for disabling the monitoring of the physical downlink control channel based at least in part on the identified type associated with the discontinuous physical downlink control channel monitoring indication.

25. The method of claim 24, wherein the temporal period for disabling the monitoring of the physical downlink control channel occurs within the active portion of the discontinuous reception cycle based at least in part on that connected mode discontinuous reception is enabled.

26. The method of claim 22, further comprising:

determining that a retransmission timer associated with the discontinuous reception cycle is disabled, wherein disabling the monitoring of the physical downlink control channel is based at least in part on determining that the retransmission timer is disabled.

27. The method of claim 22, further comprising:

determining that a retransmission timer associated with the discontinuous reception cycle is enabled; and enabling monitoring of the physical downlink control channel during at least the active portion based at least in part on determining the retransmission timer is enabled.

28. The method of claim 19, further comprising:

determining that a connected mode discontinuous reception mode is disabled for the UE, wherein receiving the downlink control information comprising the indication is based at least in part on the connected mode discontinuous reception mode being disabled.

29. A non-transitory computer-readable medium storing code for wireless communication, the code comprising instructions executable by one or more processors to:

receive downlink control information including an indication to enable discontinuous monitoring of a physical downlink control channel;

enable the discontinuous monitoring of the physical downlink control channel based at least in part on the received downlink control information; and disable, based at least in part on the received downlink control information, monitoring of the physical downlink control channel associated with a common search space set configured for a plurality of apparatuses, including the apparatus, during a temporal period in which at least one of physical downlink shared channel, downlink reference signal monitoring, uplink reference signal transmissions, and channel state information reporting is enabled.

30. A user equipment (UE) for wireless communication, comprising:

means for receiving downlink control information including an indication to enable discontinuous monitoring of a physical downlink control channel;

means for enabling the discontinuous monitoring of the physical downlink control channel based at least in part on the received downlink control information; and means for disabling, based at least in part on the received downlink control information, monitoring of the physical downlink control channel associated with a common search space set configured for a plurality of apparatuses, including the apparatus, during a temporal period in which at least one of physical downlink shared channel, downlink reference signal monitoring, uplink reference signal transmissions, and channel state information reporting is enabled.

* * * * *